United States Patent
Hoggarth

(10) Patent No.: US 12,496,229 B2
(45) Date of Patent: Dec. 16, 2025

(54) ANTIMICROBIAL WOUND DRESSING

(71) Applicant: MEDTRADE PRODUCTS LIMITED, Crewe (GB)

(72) Inventor: Andrew Hoggarth, Crewe (GB)

(73) Assignee: MEDTRADE PRODUCTS LIMITED, Crewe (GB)

( * ) Notice: Subject to any disclaimer, the term of this patent is extended or adjusted under 35 U.S.C. 154(b) by 186 days.

(21) Appl. No.: 18/566,479

(22) PCT Filed: Jun. 1, 2022

(86) PCT No.: PCT/GB2022/051407
§ 371 (c)(1),
(2) Date: Dec. 1, 2023

(87) PCT Pub. No.: WO2022/254223
PCT Pub. Date: Dec. 8, 2022

(65) Prior Publication Data
US 2024/0245556 A1    Jul. 25, 2024

(30) Foreign Application Priority Data

Jun. 2, 2021 (GB) .................................. 2107893

(51) Int. Cl.
*A61F 13/00* (2024.01)
*A61L 15/18* (2006.01)
*A61L 15/46* (2006.01)

(52) U.S. Cl.
CPC ........ *A61F 13/00063* (2013.01); *A61L 15/18* (2013.01); *A61L 15/46* (2013.01);
(Continued)

(58) Field of Classification Search
CPC .. A61F 2013/00255; A61F 2013/00863; A61F 2013/200536; A61F 2013/00174;
(Continued)

(56) References Cited

U.S. PATENT DOCUMENTS 11,007,086 B2    5/2021    Holm et al.
2008/0299163 A1*  12/2008   Haskin ................... A01N 25/34
                                                424/641

(Continued)

FOREIGN PATENT DOCUMENTS

EP          1638620 B1      2/2012
WO    WO-2016020704 A1 *   2/2016    ....... A61F 13/00063
(Continued)

OTHER PUBLICATIONS

KR 920005822 b1 translation (Year: 1992).*

*Primary Examiner* — Kim M Lewis
(74) *Attorney, Agent, or Firm* — Schwabe, Williamson & Wyatt, P.C.

(57) ABSTRACT

The present invention concerns antimicrobial multi-layer wound dressings having an antimicrobial agent located at one or more interfaces between opposing surfaces of the layers of the wound dressing. This improves the migration of antimicrobial agent and allows the dressing to provide a higher overall concentration of antimicrobial agent throughout the dressing. This will assist clinicians when treating wounds by reducing the microbial load at the wound bed thereby reducing the risk of wound infection.

17 Claims, 18 Drawing Sheets

Figure 1:
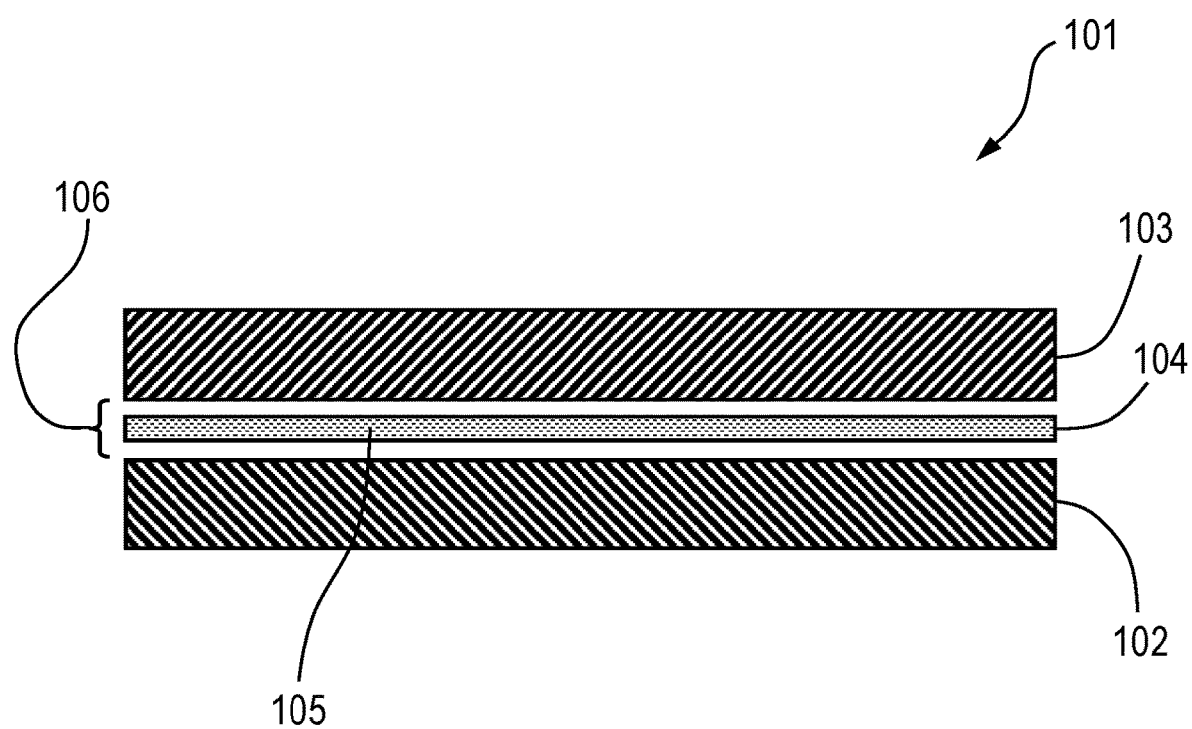

(52) U.S. Cl.
CPC ............... *A61F 2013/00604* (2013.01); *A61L 2300/104* (2013.01); *A61L 2300/106* (2013.01); *A61L 2300/404* (2013.01)

(58) Field of Classification Search
CPC ...... A61F 2013/00927; A61F 13/20239; A61F 13/022; A61F 13/025; A61F 13/0213; A61K 17/178; A61K 17/16166; A61L 2300/404; A61L 27/54; A61L 31/16; A61L 15/58; A61L 26/0066; A61L 2300/102; A61L 2300/406; A61L 24/0015
See application file for complete search history.

(56) References Cited

U.S. PATENT DOCUMENTS

| | | | |
|---|---|---|---|
| 2011/0313383 | A1 | 12/2011 | Hofstetter et al. |
| 2014/0107555 | A1* | 4/2014 | Patel ...................... A61L 15/46 424/642 |
| 2023/0414824 | A1† | 12/2023 | Brewster |

FOREIGN PATENT DOCUMENTS

| | | | | |
|---|---|---|---|---|
| WO | WO-2019012069 | A1 * | 1/2019 | ............. A61L 15/60 |
| WO | WO-2021059188 | A1 * | 4/2021 | ....... A61F 13/00063 |
| WO | 2022/254223 | A1 | 12/2022 | |

\* cited by examiner
† cited by third party

ANTIMICROBIAL WOUND DRESSING

CROSS REFERENCE TO RELATED APPLICATIONS

The present application is a national phase entry under 35 U.S.C. § 371 of International Application No. PCT/GB2022/051407, filed Jun. 1, 2022, entitled "ANTIMICROBIAL WOUND DRESSING", which claims priority to GB Application No. 2107893.6 filed on Jun. 2, 2021, which are hereby incorporated by reference in their entireties.

TECHNICAL FIELD OF THE INVENTION

The present invention relates to multi-layer wound dressings, and more particularly to antimicrobial multi-layer wound dressings.

BACKGROUND TO THE INVENTION

The use of topical multi-layer wound dressings is well established in the treatment of wounds. Wound dressings are often designed to manage wound exudate by absorbing fluid from the wound while still maintaining a moist wound healing environment. Typically, a multi-layer wound dressing may comprise a wound contact layer, one or more absorbent layers and a backing layer.

A consideration when designing wound dressings is in the management of wound infection. Infection of the wound bed can disrupt the natural healing process and lead to wound chronicity. As well as delaying wound healing, wound infections can cause pain and discomfort to patients and even lead to further complications such as systemic infections or septic shock. The use of antimicrobial wound dressings can reduce the microbial load of the wound bed and therefore reduce the risk of wound infection. Antimicrobial wound dressings have antimicrobial agents incorporated into their construction which kill or inhibit growth of microorganisms such as bacteria.

Designing an effective antimicrobial dressing can be challenging for several reasons. One challenge is the difficulty in incorporating a sufficiently high concentration of antimicrobial agent within the dressing to be effective at reducing microorganisms over the wear-time of the product. This can be due to limitations in the manufacturing process. For example, spray coating of an antimicrobial agent onto textiles requires that the concentration of the antimicrobial agent be limited depending on the viscosity of the solvent in order to enable uniform spraying. Similarly, when incorporating an antimicrobial agent into a solid absorbent material such as a polyurethane foam, the concentration of the antimicrobial agent is limited so that it does not affect the primary absorbent function of the material. The inclusion of an active agent must also not be so great as to impact the physical performance properties of the dressing, such as absorbency.

A further challenge is ensuring that the antimicrobial agent is released on contact with wound exudate and suitably passes through the layers to reach the undesirable microorganisms. Many wound dressings have been designed with high absorbency and quickly pull wound exudate through the layers, trapping wound exudate and microorganisms in an absorbent layer. This can be detrimental to the antimicrobial efficacy of the dressing and results in microorganisms being located away from the antimicrobial agents in the dressing.

There is therefore a need to develop improved methods of incorporating antimicrobial agents into wound dressings. There is also the need to develop a multi-layered wound dressing having improved antimicrobial efficacy.

The present invention has been developed with the aforementioned problems in mind and seeks to overcome these or other disadvantages.

SUMMARY OF THE INVENTION

According to a first aspect of the present invention, there is provided a multi-layer wound dressing comprising at least a first layer and a second layer, wherein the first layer is adjacent to the second layer and bonded thereto; and an antimicrobial agent, wherein the antimicrobial agent is located at an interface between opposing surfaces of the first and the second layers.

It has been discovered that locating an antimicrobial agent at an interface between opposing surfaces of adjacent first and second layers provides a wound dressing having an improved antimicrobial efficacy.

Moreover, by locating an antimicrobial agent at an interface between opposing surfaces of adjacent first and second layers it has been observed that there is an improved overall concentration of antimicrobial agent throughout the dressing.

Without being bound by theory, the location of an antimicrobial agent at an interface between adjacent first and second layers enables the antimicrobial agent to migrate more effectively throughout the dressing since it is not bound within a layer. This is thought to be because the solubility of the antimicrobial agent into the absorbed liquid is faster as it does not rely initially on the antimicrobial eluting out of other materials. Therefore, since the antimicrobial agent is absorbed faster into any wound exudate it is in turn able to migrate faster and more uniformly throughout the dressing, which is especially advantageous in dressings containing gelling absorbent materials. In the case of a gelling material, the antimicrobial agent is able to migrate throughout the dressing before the absorbent materials gel and prevent the fluid from moving further through the dressing. In contrast, in the dressings of the prior art where the antimicrobial agent is incorporated in an absorbent material, as the liquid migrates through the dressing, the absorbent materials lock the fluid in and therefore prevent the effective migration of antimicrobial agent throughout the dressing.

Moreover, by locating an antimicrobial agent at an interface between adjacent first and second layers, a greater overall concentration of antimicrobial agent may be incorporated into the dressing. This is beneficial since often the amount of antimicrobial agent which can be included into a layer is limited due to constraints in the manufacturing process or due to a reduction in the absorbent properties of the layer. For example, most manufacturing processes are only capable of holding up to a specific concentration of antimicrobial agent before the concentration reaches a level which then impacts the properties of the material, such as, absorbency, tensile strength, and fluid wicking. Consequently, by incorporating an antimicrobial agent at an interface between adjacent first and second layers, the antimicrobial agent may be included at a higher concentration without inhibiting or compromising the performance properties of the dressing.

Therefore, by locating an antimicrobial agent at an interface between adjacent first and second layers, an antimicrobial agent may be incorporated into a wound dressing with a reduced number of manufacturing steps. For example, the layers of the dressing need not undergo any additional processing steps to incorporate an antimicrobial agent, which as noted above may be subject to several manufacturing constraints.

Consequently, the present invention also provides an improved method of incorporating an antimicrobial agent into a wound dressing and may reduce the cost and improve the efficiency of the manufacturing process.

The term 'multi-layer' is used herein to mean at least two layers. The multi-layer wound dressing of the present invention may comprise more than two layers.

The term 'adjacent to' is used herein to refer to component parts of the wound dressing that are next to each other. The term 'adjacent to' may refer to component parts of the wound dressing that are next to each other and separated only by a bonding material and/or an antimicrobial agent, as desired or as appropriate. The term 'adjacent to' may also refer to component parts of the wound dressing that are next to each other without any further components being located therebetween.

The terms 'proximal' and 'distal' are used relative to a wound site. A 'proximal surface' refers to a surface of a component of the dressing that, in use, faces toward the wound site and a 'distal surface' refers to a surface of a component of the dressing that, in use, faces away from the wound site. For example, the first and the second layers each have proximal and distal surfaces. In some embodiments, the distal surface of the first layer opposes the proximal surface of the second layer.

Similarly, a 'proximal layer' can be used to refer to a layer that is located closer to a wound site relative to a 'distal layer' that is located further away from the wound site.

The term 'wound' is used herein to refer to any breach or opening in the skin or subcutaneous tissue at a physiological target site of a human or animal. Typically, the wound dressing of the present invention is applicable to a physiological target site of a human. The term physiological target site may also be referred to herein as a wound site. The dressing is suitable for application to a variety of wounds. These may include diabetic foot ulcers, burns, pressure sores, venous and arterial ulcers, surgical wounds, lacerations, cuts and grazes.

A wound dressing may also be considered antimicrobial if it is able to kill, or inhibit the growth of, microorganisms. More specifically, according to the American Association of Textile Chemists (AATCC) Test Method 100, in order for a wound dressing to be considered antimicrobial, it must demonstrate a 4-log reduction against three Gram positive bacteria, three Gram negative bacteria, a yeast and a mould within 24 hours.

Therefore, the term 'antimicrobial wound dressing' may be used herein to refer to a wound dressing that is capable of demonstrating a 4-log reduction against three Gram positive bacteria, three Gram negative bacteria, a yeast and a mould within 24 hours.

Preferably, the antimicrobial agent is not directly attached to a layer of the multi wound dressing. Preferably still, the antimicrobial agent is not directly attached to any layer of the multi wound dressing.

This allows the antimicrobial agent to migrate more effectively throughout the dressing since it is not attached to a layer or bound within a layer of the wound dressing. This is especially advantageous in dressings containing gelling absorbent materials. For example, since the antimicrobial agent is able to migrate throughout the dressing before the absorbent materials gel and prevent the fluid from moving further through the dressing. In contrast, in the dressings of the prior art where the antimicrobial agent is incorporated or attached to an absorbent material, as the liquid migrates through the dressing, the absorbent materials lock the fluid in and therefore prevent the effective migration of antimicrobial agent throughout the dressing.

The multi-layer wound dressing may comprise more than two layers. The wound dressing may comprise additional layers, such as third, fourth, fifth, sixth, seventh, eighth, ninth and tenth layers, or more. In such embodiments, the wound dressing will comprise interfaces between the opposing surfaces of each pair of adjacent layers, such as a first interface between opposing surfaces of the first and second layers, a second interface between opposing surfaces of the second and third layers, a third interface between opposing surfaces of the third and fourth layers, and so on.

The multi-layer wound dressing may comprise a third layer. The third layer may be adjacent to the second layer, creating a second interface between opposing surfaces of the second and the third layers.

The multi-layer wound dressing may comprise a fourth layer. The fourth layer may be adjacent to the third layer, creating a third interface between opposing surfaces of the third and the fourth layer.

The multi-layer wound dressing may comprise a fifth layer. The fifth layer may be adjacent to the fourth layer, creating a fourth interface between opposing surfaces of the fourth and the fifth layer.

The multi-layer wound dressing may comprise a sixth, seventh, eighth, ninth, tenth or more layers, as desired or as appropriate. Each additional layer creates a further interface between opposing surfaces of it and its adjacent layer, such as a fifth, sixth, seventh, eighth and ninth interfaces or more, respectively.

The antimicrobial agent may further be located at any one or more of the second, third, fourth, fifth, sixth, seventh, eighth and ninth interfaces.

Beneficially, when the antimicrobial agent is located at more than one interface, antimicrobial agent is better able to migrate throughout the dressing, since there are more locations for the antimicrobial agent to absorb into the wound exudate.

One or more of the additional layers may be bonded to its adjacent layer.

Any pair of adjacent layers may be bonded together by any conventional means in the art. For example, any pair of adjacent layers may be bonded by means of an adhesive, heat or pressure.

Any pair of adjacent layers may be bonded together at a perimeter of the layers.

Alternatively, any pair of adjacent layers may be bonded at a major surface of the layers.

Typically, wound dressings employ powder bonding, thermal bonding, physical and latex bonding. Any of these processes could be adapted to bond any pair of adjacent layers referred to herein.

Powder bonding uses meltable powders which are polyester, polypropylene, acrylic or polyethylene based. Thermal bonding uses meltable fibres such as those which are polypropylene, polyester or polyethylene-based. Latex bonding uses liquid latex adhesive which can be, for example, acrylic based, for example. Physical bonding occurs when materials are physically entangled or pushed together by a force such as pressure.

Preferably, any one or more pairs of adjacent layers may be bonded by means of an adhesive.

Preferably, the first and the second layers are bonded by means of an adhesive.

The adhesive may be a silicone adhesive, such as a polydimethylsiloxane adhesive.

Alternatively, the adhesive can be an acrylic adhesive, a polyurethane adhesive, a hydrogel adhesive, or any combinations thereof.

The adhesive may be in the form of a powder, a liquid, a web or a net. The web may be an acrylic web.

The adhesive may comprise a meltable adhesive and/or a pressure sensitive adhesive, or the like. The meltable adhesive may be a heat-bonding adhesive. The pressure sensitive adhesive may be acrylic based.

The adhesive may be a thermal adhesive. The adhesive may comprise any suitable thermal adhesive known in the art. For example, the thermal adhesive may be a thermoplastic adhesive, such as polycaprolactone.

The adhesive may be a powder. The powder may be scattered onto either or both of the first and the second layers and then activated by the application of heat. For example, the wound dressing may be passed through a heat tunnel to attach the first layer to the second layer.

Preferably, the antimicrobial agent is mixed with the adhesive.

Beneficially, mixing the antimicrobial agent with an adhesive provides an improved method of incorporating an antimicrobial into a wound dressing, since mixing an antimicrobial agent with an adhesive is not subject to the same manufacturing constraints as incorporating an antimicrobial agent into an absorbent layer. Moreover, when an antimicrobial agent is mixed with an adhesive, the adhesive helps secure the antimicrobial agent in the dressing during manufacture. Beneficially, this reduces the loss of antimicrobial agent from the dressing during manufacture, such as during cutting. Advantageously, this reduces waste and cost.

Preferably, the antimicrobial agent may be in a dry form. In this case, the antimicrobial agent may be applied to an interface between any pair of adjacent layers by any solid application process known in the art. Such methods may include application of the antimicrobial agent as a dry film at an interface between any pair of adjacent layers, powder coating the antimicrobial agent at an interface between any pair of adjacent layers or scatter coating particles, flakes, granules, or crystals of the antimicrobial agent at an interface between any pair of adjacent layers.

Beneficially, when the antimicrobial agent is in a dry form, greater amounts of antimicrobial agent may be applied to the dressing.

Preferably, the antimicrobial agent may be in the form of a film, powder, flake, granules or crystals.

Alternatively, the antimicrobial agent may be in the form of a solution. In this case, the antimicrobial agent in solution may be applied to the wound contact layer by any liquid application process known in the art.

Antimicrobial agents are generally referred to as substances that kill, or inhibit the growth of, microorganisms.

The antimicrobial agent may be selected from the group consisting of silver, silver derivatives, lactic acid, citric, acid, benzalkonium chloride, iodine, iodate salts, iodide salts, copper, copper salts, zinc, zinc salts, toluidine blue O, xylitol, chlorhexidine gluconate, polyhexamethylene biguanide (PHMB), miconazole nitrate and combinations of any two or more thereof.

The antimicrobial agent of the present invention may comprise one or more substances that are either capable of demonstrating a Log 4 bacterial kill rate within 24 hours alone or reactable with another material to form a substance capable of demonstrating a Log 4 bacterial kill rate within 24 hours.

Suitable substances capable of demonstrating a Log 4 bacterial kill rate within 24 hours alone may be selected from the group consisting of silver, silver derivatives, lactic acid, citric, acid, benzalkonium chloride, iodine, copper, copper salts, zinc, zinc salts, toluidine blue O, xylitol, chlorhexidine gluconate, polyhexamethylene biguanide (PHMB), miconazole nitrate and combinations of any two or more thereof.

Suitable substances reactable with another material to form a substance capable of demonstrating a Log 4 bacterial kill rate within 24 hours may be selected from the group consisting of iodide salts, iodate salts. For example, an iodide salt can react with an iodate salt to produce iodine, which is a substance capable of demonstrating a Log 4 bacterial kill rate within 24 hours.

The iodide salt and iodate salt may react to form iodine in situ. For example, the iodate salt and/or iodide salt may dissolve in wound exudate to form iodine in situ.

In such embodiments, the iodide salt and iodate salt may react to form iodine at the interface of the wound dressing.

The iodide salt and iodate salt may be located together at the interface.

Alternatively, the iodide salt may be located at the first interface and the iodate salt may be located in a separate part of the wound dressing. For example, the iodide salt may be located at the first interface and the iodate salt may be located in the first and/or second layer and/or at a further interface.

Alternatively, the iodate salt may be located at the first interface and the iodide salt may be located in a separate part of the wound dressing. For example, the iodate salt may be located at the first interface and the iodide salt may be located in the first and/or second layer and/or at a further interface.

Preferably, the iodate salt is selected form the group consisting of potassium iodate, sodium iodate and/or any two or more combinations thereof.

Preferably the iodide salt is selected from the group consisting of potassium iodide, sodium iodide and/or any two or more combinations thereof.

By silver derivative it is meant any compound or complex that is derived from silver following one or more chemical reactions or modifications. The one or more chemical reactions or modifications may involve formation of a silver salt.

Preferably, the antimicrobial agent is a silver or silver derivative.

More preferably, the antimicrobial agent is a silver salt. Preferably, the silver salt is selected from silver lactate, silver chloride, silver carbonate, silver sulfate, silver sulphadiazine.

Beneficially, it has been found that the use of a silver salt provides an antimicrobial agent which is better able to migrate throughout the dressing, since the silver salt has been observed to demonstrate improved solubility in the wound exudate.

Preferably, the antimicrobial agent is present in an amount of 0.001 to 10 wt % of the multi-layer wound dressing.

In a preferred embodiment, the antimicrobial agent is able to migrate throughout the dressing within 24 hours of being applied to a wound. More preferably, the antimicrobial agent is able to migrate throughout the dressing within 12 hours of application at an interface between opposing surfaces of the first and the second layer, most preferably within 2 hours of application at an interface between opposing surfaces of the first and the second layer. By migrate throughout the dressing, it is meant that the antimicrobial agent may be detected in the outer proximal or distal layers of the multi-layer dressing within the aforementioned time periods.

The layers of the multi-layer wound dressing may be, or be formed from, any material typically used in a wound dressing.

In addition to at the interface, the antimicrobial agent may also be present in any layer of the multi-layer wound dressing. For example, the antimicrobial agent may be located in the first and/or the second layer. The antimicrobial agent may be present in any one or more of the third, fourth, fifth, sixth, seventh, eighth, ninth, and/or tenth layers, or more.

The antimicrobial agent may be dispersed throughout any of the layers of the multi-wound dressing.

Beneficially, when the antimicrobial agent is also located in a layer of the multi-layer wound dressing, the overall antimicrobial concentration in the dressing is increased, thereby increasing the antimicrobial efficacy of the dressing.

The layers of the multi-wound dressing may comprise any conventional layers typically utilised in a wound dressing. For example, the layers may include a wound contact layer, one or more absorbent layers, and/or a backing layer.

One of the layers of the multi-layer wound dressing may be a wound contact layer.

The first or the second layer may be a wound contact layer.

By wound contact layer it is meant a layer which is intended for direct contact with the wound.

The wound contact layer may be an absorbent material as described herein.

The wound contact layer may have a laminate structure. The laminate structure may comprise two or more layers.

The wound contact layer may comprise a trilaminate structure. The trilaminate structure may have a central carrier layer, a proximal layer and a distal layer. The proximal layer may comprise an adhesive for contacting and securing the wound contact layer to the wound and/or the patient's skin. The distal layer may comprise an adhesive for securing the wound contact layer a distal adjacent layer.

The wound contact layer may comprise one or more perforations. The perforations may extend fully through the wound contact layer.

The wound contact layer may have a generally rectangular shape, although it will be understood by those skilled in the art that the wound contact layer is not limited to a specific shape and may include other shapes and overall dimensions.

One or more layers of the multi-layer wound dressing may be an absorbent layer.

The first and/or the second layer may be an absorbent layer.

By absorbent layer, it is meant a layer comprising an absorbent or superabsorbent material.

The term 'absorbent material' is used herein to refer to a physiologically acceptable material that is capable of absorbing liquid, such as wound exudate, and which is capable of absorbing liquid to greater than about 500% by weight of the absorbent material, and with a liquid retention of greater than about 40%.

The absorbent material may comprise a fibrous, foam, non-woven and/or woven material.

The absorbent material may be in the form of fibres. Typically, the absorbent material is in the form of non-woven fibres. The length of the fibres can be up to about 100 mm, and is typically from about 20-75 mm, more typically from about 32 to 51 mm.

The absorbent material may comprise, or consist of, a foam, such as a polymeric foam material, that is not a superabsorbent material. The polymeric foam may be a polyurethane foam. The polymeric foam may be open cell. The polymeric foam may be hydrophilic.

The absorbent material may comprise, or consist of, a gelling or semi-gelling material.

The term 'gelling material' is used herein to refer to a material in which substantially all of the components therein may gel upon contact with water or body fluid(s). For example, it may comprise a fibrous material wherein substantially all of the fibres are capable of gelling upon contact with water or body fluid(s).

The term 'semi-gelling' is used herein to refer to a material that comprises a mixture of components, some of which gel upon contact with water or body fluid(s) and some of which do not. For example, a semi-gelling absorbent material may comprise a combination of fibres, some of which gel upon contact with water or body fluid(s) and some of which do not.

The gelling or semi-gelling material may be in any available form, such as for example, fibres, granules, powder, flakes, sheet, foam, freeze dried foam, compressed foam, film, perforated film, beads, and combinations of two or more of the aforesaid.

The gelling or semi-gelling material may be selected from carboxymethylcellulose, alginate, chitosan salt or a chitosan salt derivative.

Typically, the gelling or semi gelling material is in the form of fibres. The fibres can be of any desired diameter or length and can be formed into a textile fabric or a pad for use. The fibres may be woven or non-woven. Preferably, the fibres are non-woven.

The term 'superabsorbent material' is used herein to refer to a hydrophilic material that is water-swellable, but not water soluble, and which is capable of absorbing liquid to greater than about 2000% by weight of the superabsorbent material, preferably greater than about 2500%, with a liquid retention of greater than about 85%, preferably greater than about 90%.

The superabsorbent material may be selected from polymeric materials such as poly(vinyl) alcohol (PVA), poly (ethylene oxide) (PEO) and poly(acrylic acid).

The superabsorbent material may be chemically modified. For example, the superabsorbent material may be a polymeric material obtained by graft polymerisation of acrylic acid onto a chain of carboxymethyl cellulose.

The superabsorbent material may comprise a chemically modified material selected from starch, cellulose and polymeric materials such as poly(vinyl alcohol) (PVA), poly (ethylene oxide) (PEO), and poly(acrylic acid).

The poly(acrylic acid) may be a partially neutralised, lightly cross-linked poly(acrylic acid).

The superabsorbent material may be in the form of fibres. Typically, the superabsorbent material is in the form of non-woven fibres. The length of the fibres can be up to about 100 mm, and is typically from about 20-75 mm, more typically from about 32 to 51 mm.

The superabsorbent material may comprise or consist of an air laid nonwoven fibre. By air laid nonwoven fibre, it is meant a continuous web formed by a mixture of short fibres and/or 100% pulped fibres.

One or more of the layers of the multi-layer wound dressing may be a backing layer.

The first or the second layer may be a backing layer.

The backing layer may serve as a barrier and may be operable to prevent microorganisms, such as bacteria, from entering the wound dressing from an external source, such as clothing, etc. Further, the backing layer is also operable to retain wound exudate within the wound dressing and prevent it leaching out of the wound dressing.

The backing layer may be gas-permeable. The backing layer may be substantially impermeable to microorganisms, such as bacteria. The backing layer may be substantially impermeable to liquids.

The permeability of the backing layer to gases, such as air and moisture vapour, permits the transmission of moisture vapour through its structure. This facilitates the transpiration of wound exudate from the dressing into the external environment. Beneficially, this increases the breathability of the dressing and prevents the saturation of the dressing with exudate, which leads to a reduced number of dressing changes.

The backing layer may have a moisture vapour transmission rate in the range of 50 g/100 cm2/24 hours to 200 g/100 cm2/24 hours. Good results are observed when the backing layer has a moisture vapour transmission rate in the range of 80 g/100 cm2/24 hours to 160 g/100 cm2/24 hours. In a preferred embodiment, the backing layer has a moisture vapour transmission rate of 100 g/100 cm2/24 hours to 120 g/100 cm2/24 hours.

The backing layer may comprise a material that is gas-permeable and liquid impermeable.

The backing layer may also comprise a material that is microorganism impermeable.

The backing layer may comprise, or consist of, any biologically acceptable polymer material that is liquid- and/or microorganism-impermeable but gas-permeable. Suitable biologically acceptable polymer materials for the backing layer may be selected from the group consisting of polyurethane and polyethylene.

In a preferred embodiment of the present invention, the first layer may be a wound contact layer and the second layer may be an absorbent layer. The absorbent layer may comprise, or consist of, a superabsorbent material. The antimicrobial agent may be located at the first interface between the opposing surfaces of the wound contact layer and the absorbent layer.

When an antimicrobial agent is located at an interface between a wound contact layer and an absorbent layer, at least a portion of the antimicrobial agent may, in use, migrate into the absorbent layer. This is thought to be due to the antimicrobial agent solubilising in wound exudate as the exudate passes through the wound contact layer and into the absorbent layer, carrying the antimicrobial agent with it. This migration is beneficial as it allows the antimicrobial agent to act on the mass of exudate absorbed in the absorbent layer. This prevents the growth of microorganisms within the interior of the dressing.

In another preferred embodiment of the present invention, the first layer may be a wound contact layer, the second layer may be an absorbent layer and a third layer may be a backing layer. In such an embodiment, the antimicrobial agent may be located at the first interface between the opposing surfaces of the wound contact layer and the absorbent layer. Additionally, the antimicrobial agent may be located at the second interface between the absorbent layer and the backing layer. Alternatively, the antimicrobial agent may only be located at the first interface between the wound contact layer and the absorbent layer or the second interface between the absorbent layer and the backing layer.

In a further preferred embodiment of the present invention, the first layer may be a wound contact layer, the second layer may be an absorbent layer, a third layer may be a further absorbent layer comprising a superabsorbent material and a fourth layer may be a backing layer. In such an embodiment, the antimicrobial agent may be located at the first interface between the opposing surfaces of the wound contact layer and the absorbent layer. Additionally, the antimicrobial agent may be located at the second interface between the absorbent layer and the further absorbent layer. The antimicrobial agent may also be located at the third interface between the further absorbent layer and the backing layer. Alternatively, the antimicrobial agent may be located at the first interface between the wound contact layer and the absorbent layer and/or the second interface between the absorbent layer and the further absorbent layer and/or the third interface between the further absorbent layer and the backing layer.

According to a second aspect of the present invention, there is provided a method of manufacturing a multi-layer wound dressing, the method comprising the steps of applying an antimicrobial agent to a surface of a first and/or a second layer, locating the first and second layers adjacent to each other and bonding the first layer to the second layer, such that the antimicrobial agent is located at an interface between opposing surfaces of the first and the second layer.

Preferably, the step of applying the antimicrobial agent to the surface of the first and/or second layer includes mixing the antimicrobial agent with an adhesive.

According to a further aspect of the present invention there is provided a multi-layer wound dressing for use as a medicament.

According to a further aspect of the present invention, there is provided a multi-layer wound dressing for use in killing or inhibiting the growth of microorganisms.

According to a further aspect of the invention, there is provided a multi-layer wound dressing for use in absorbing fluid discharged from a physiological target, or for use in stemming a flow of a fluid discharged from a physiological target site.

The further aspects of the present invention may incorporate any of the features of the other aspects of the invention described herein as desired or as appropriate.

DETAILED DESCRIPTION OF THE INVENTION

In order that the invention may be more clearly understood, one or more embodiments thereof will now be described, by way of example only, with reference to the accompanying drawings of which:

FIG. 1: shows an exploded view of a first embodiment of a multi-layer wound dressing.

Figure 2:
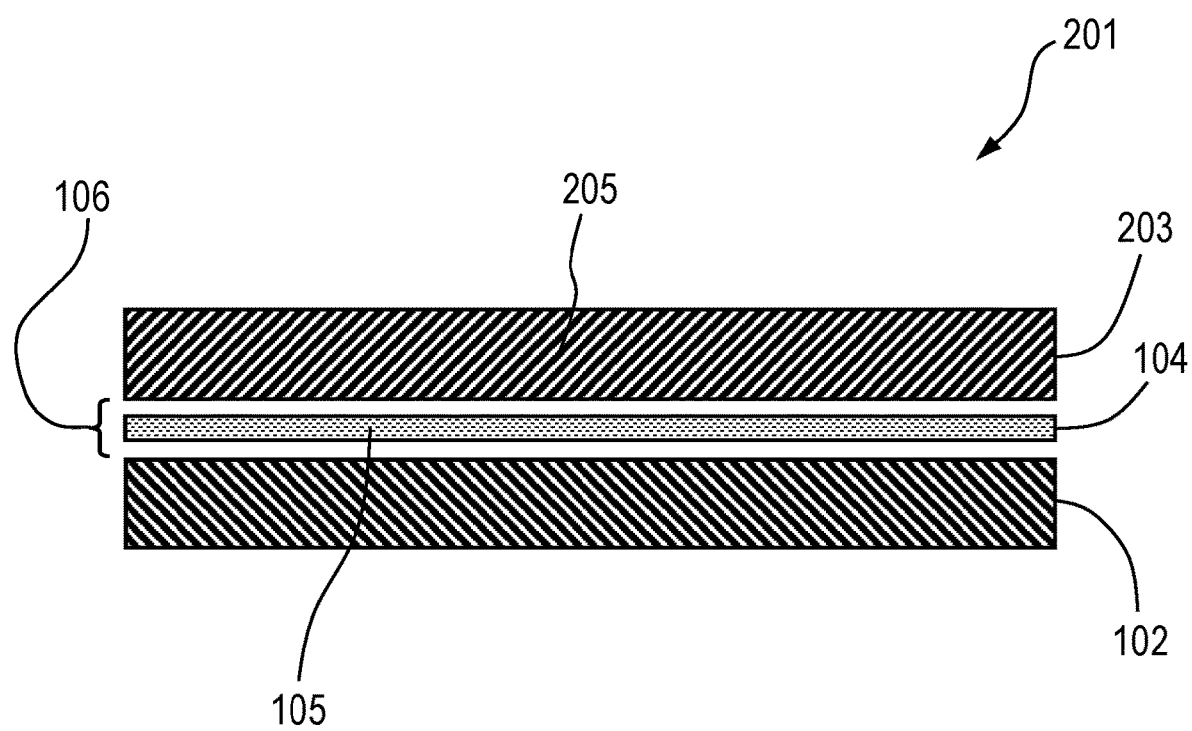

FIG. 2: shows an exploded view of a second embodiment of a multi-layer wound.

Figure 3:
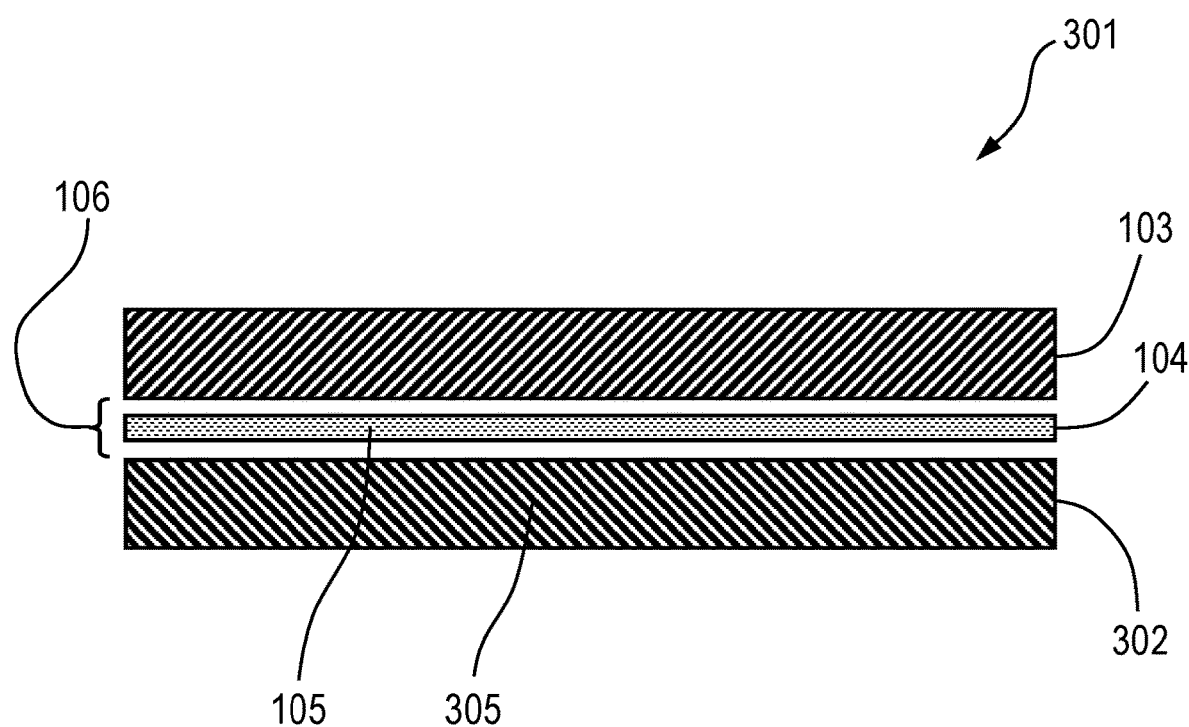

FIG. 3: shows an exploded view of a third embodiment of a multi-layer wound dressing.

Figure 4:
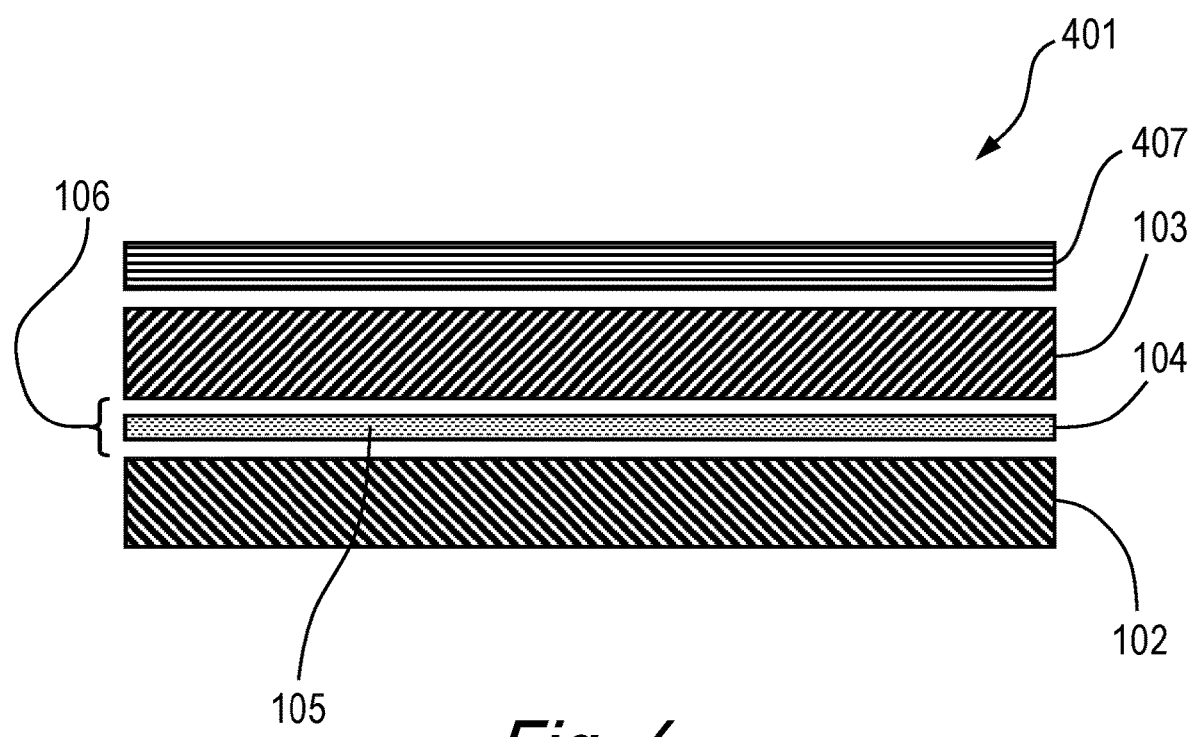

FIG. 4: shows an exploded view of a fourth embodiment of a multi-layer wound dressing.

Figure 5:
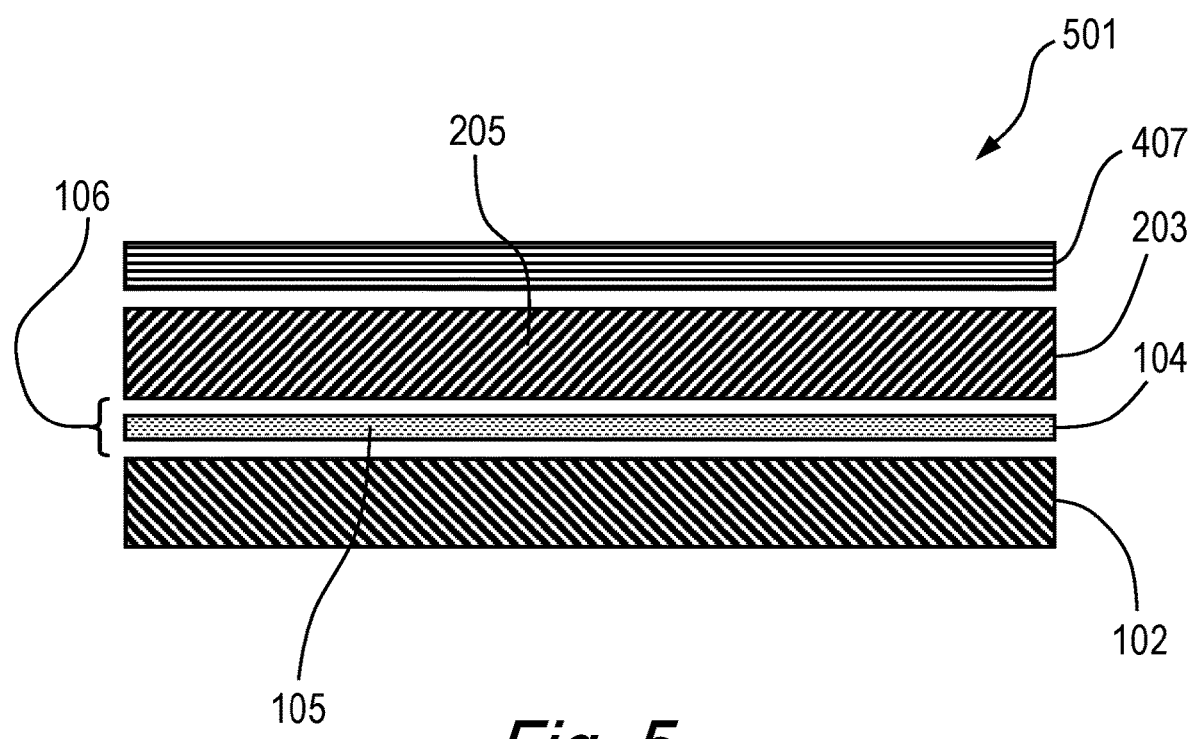

FIG. 5: shows an exploded view of a fifth embodiment of a multi-layer wound dressing.

Figure 6:
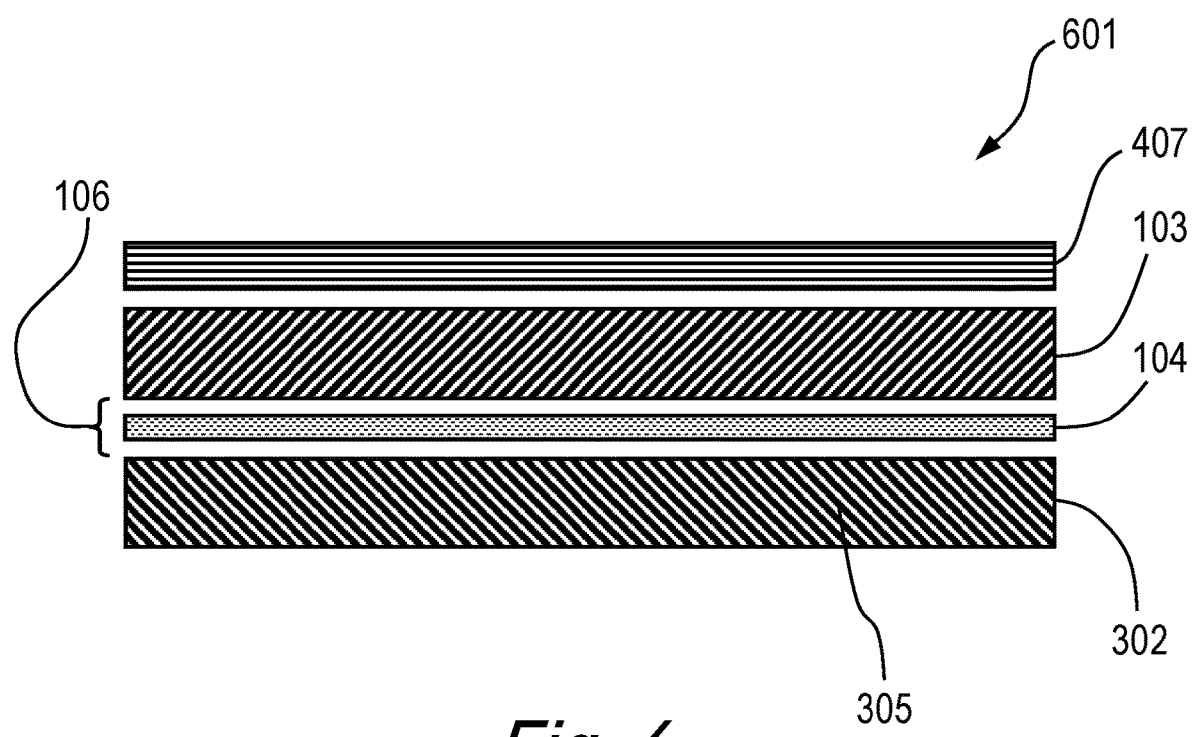

FIG. 6: shows an exploded view of a sixth embodiment of a multi-layer wound dressing.

Figure 7:
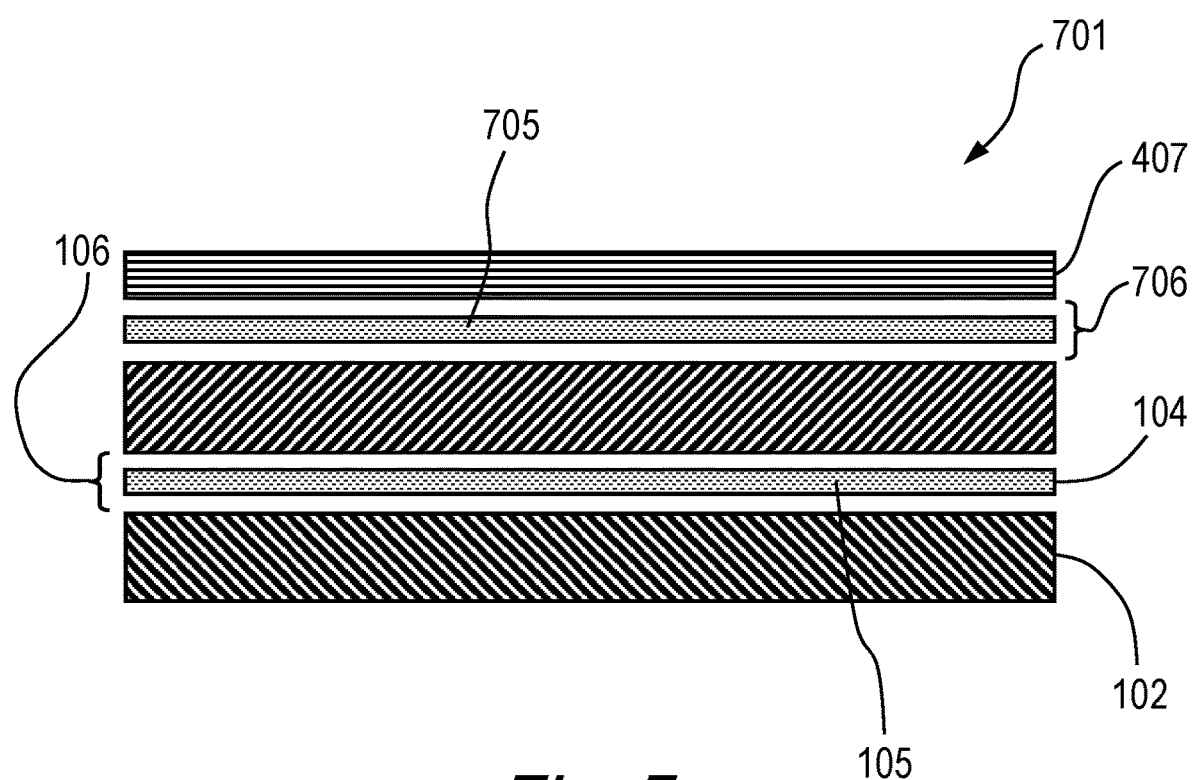

FIG. 7: shows an exploded view of a seventh embodiment of a multi-layer wound dressing.

Figure 8:
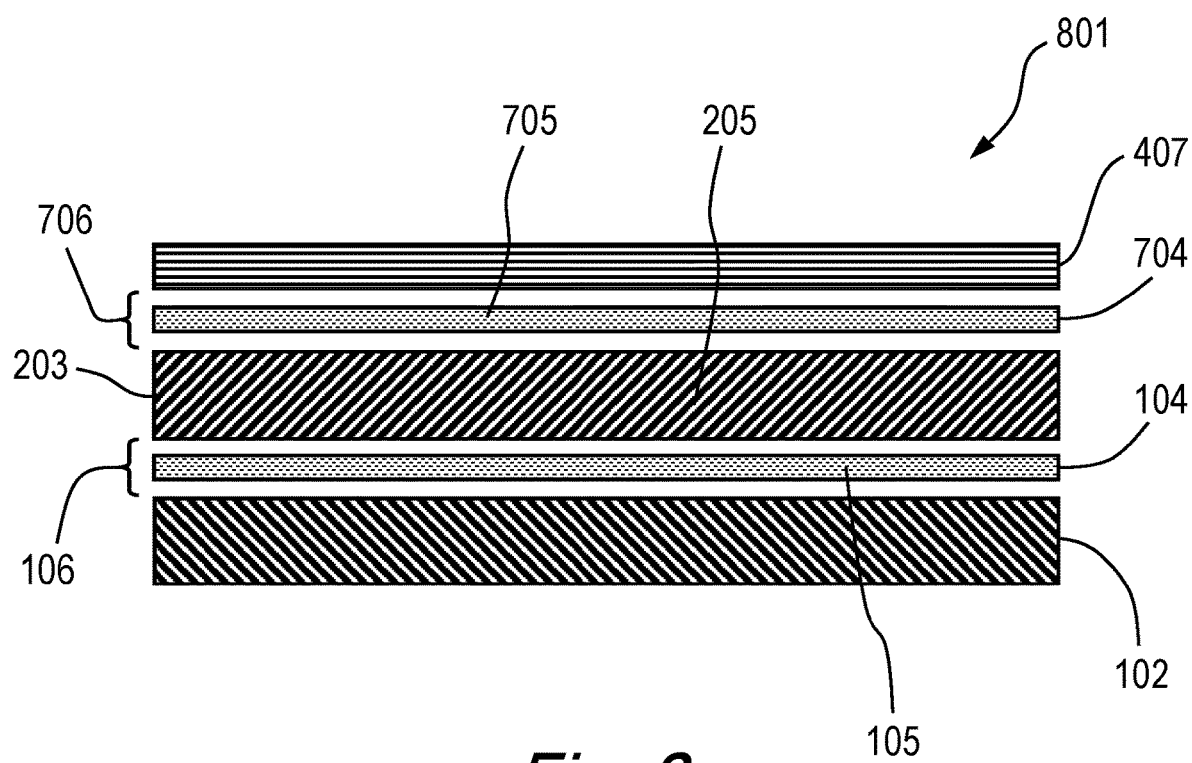

FIG. 8: shows an exploded view of an eight embodiment of a multi-layer wound dressing.

Figure 9:
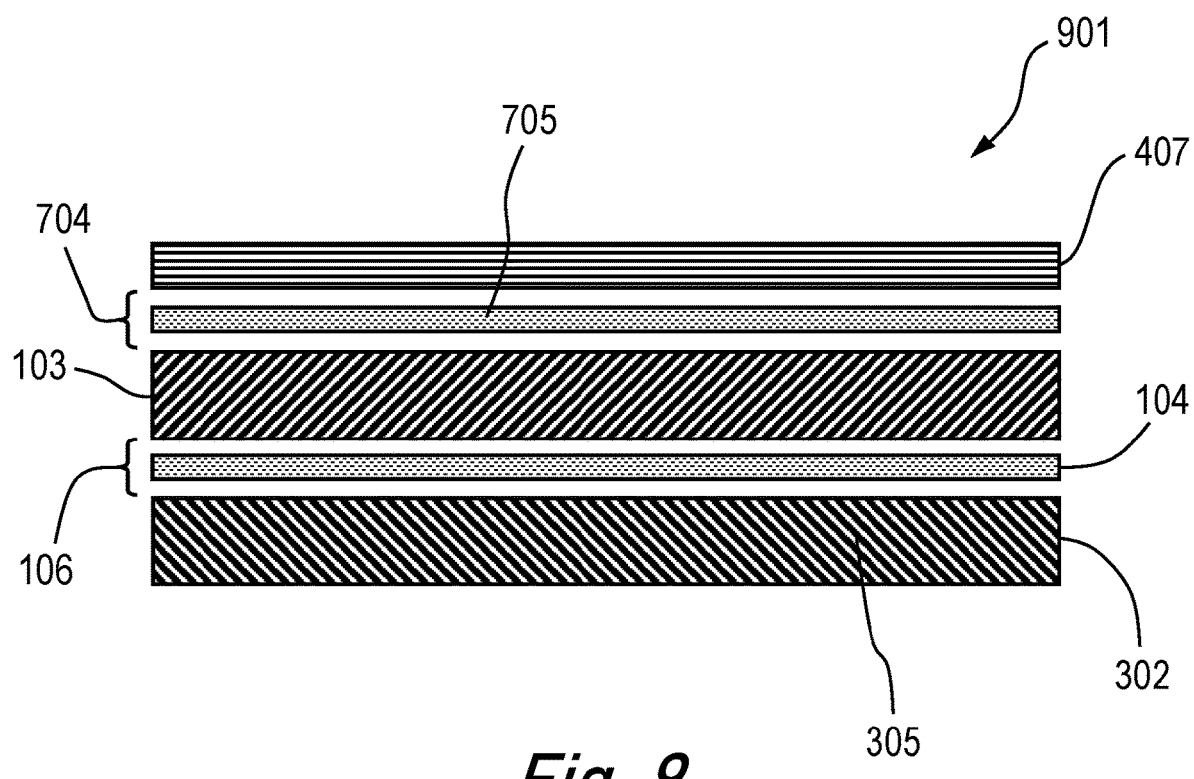

FIG. 9: shows an exploded view of a ninth embodiment of a multi-layer wound dressing.

Figure 10:
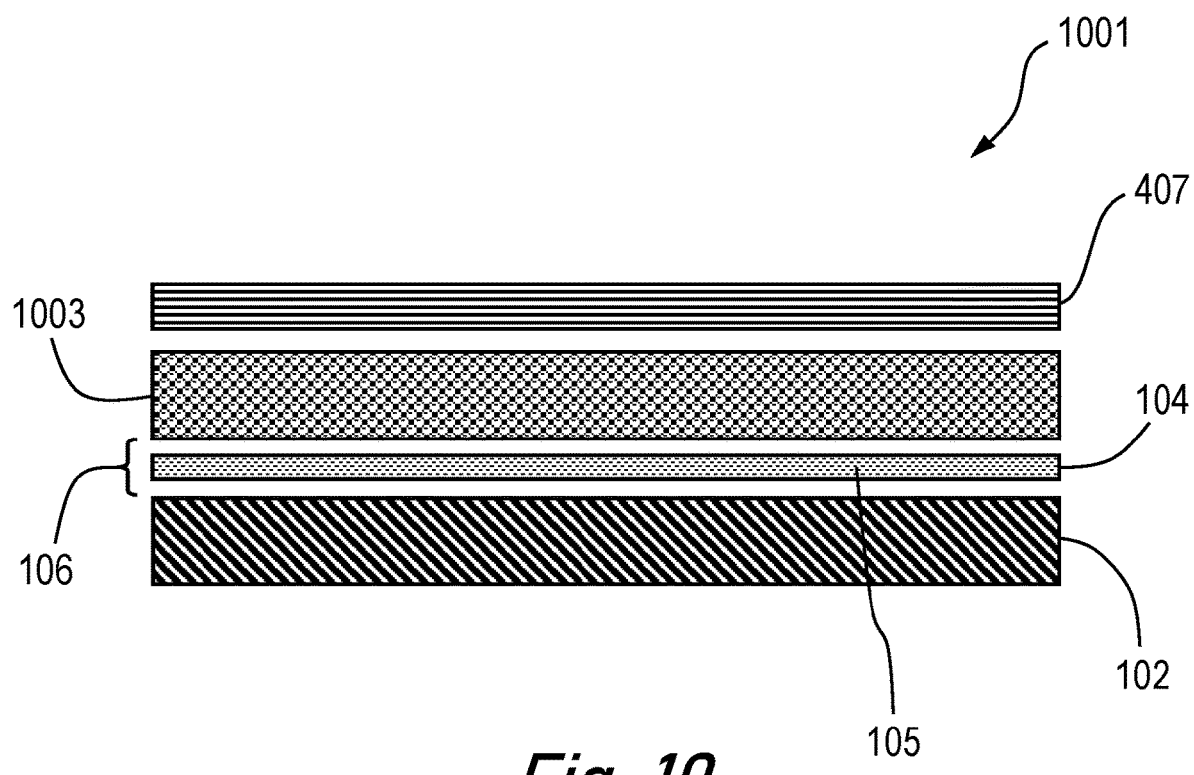

FIG. 10: shows an exploded view of a tenth embodiment of a multi-layer wound dressing.

Figure 11:
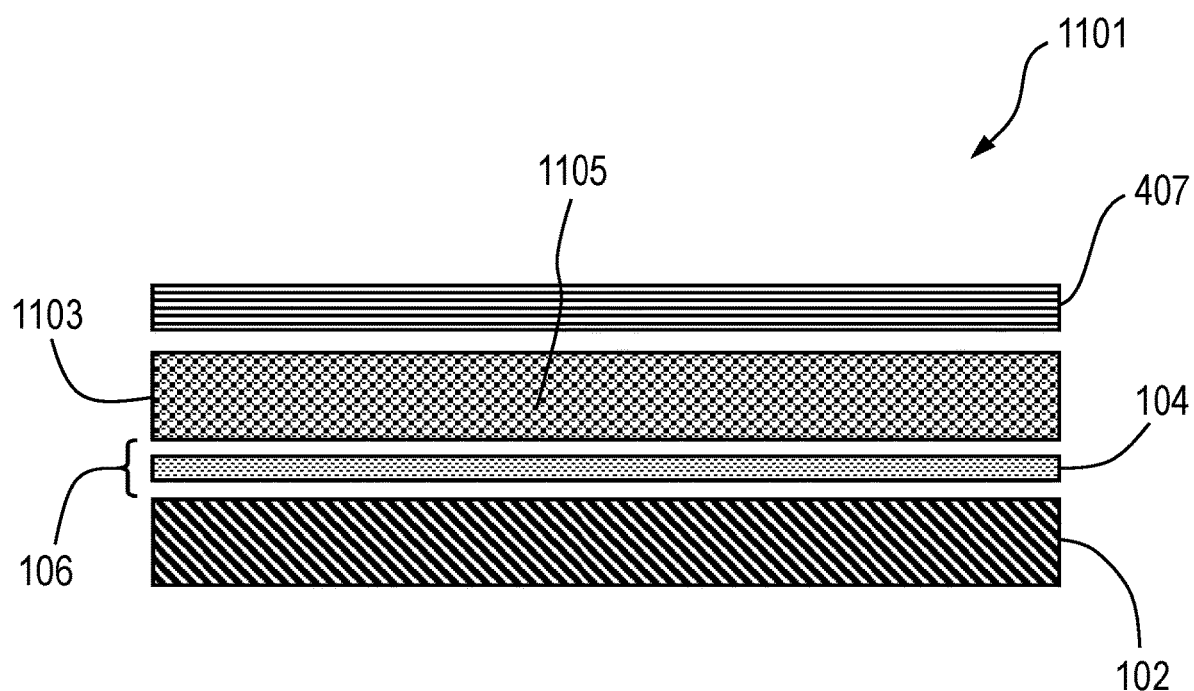

FIG. 11: shows an exploded view of an eleventh embodiment of a multi-layer wound dressing.

Figure 12:
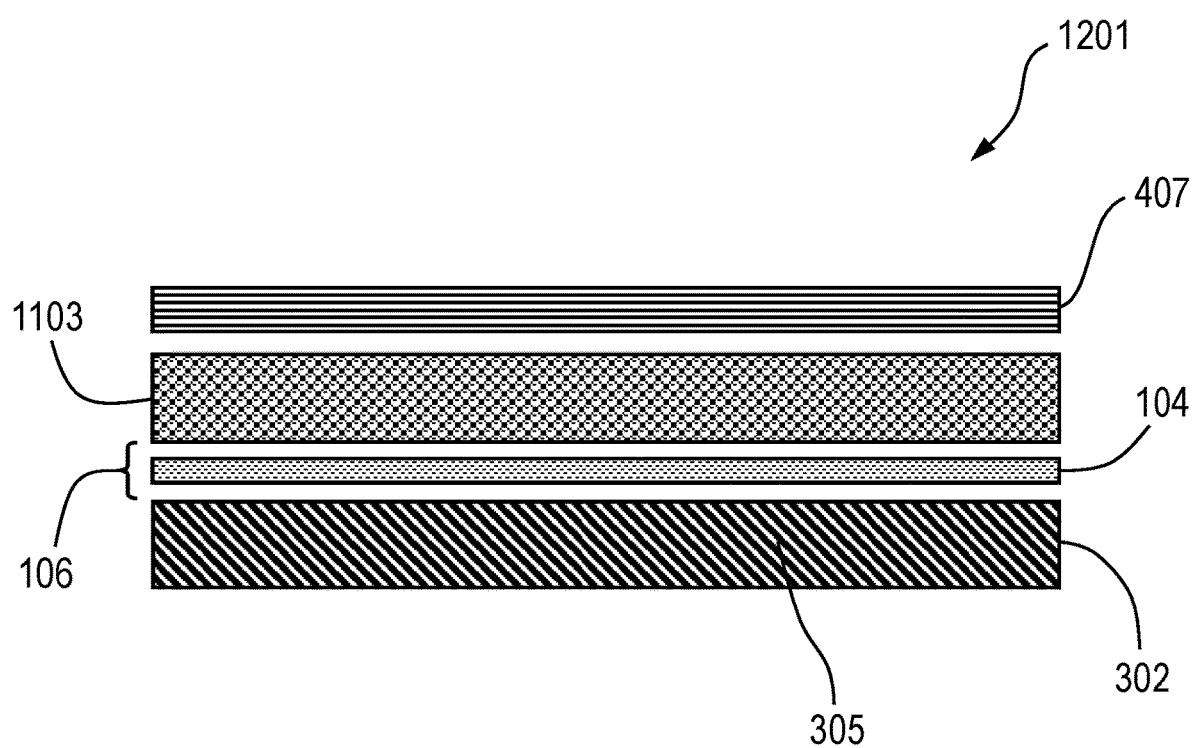

FIG. 12: shows an exploded view of a twelve embodiment of a multi-layer wound dressing.

Figure 13:
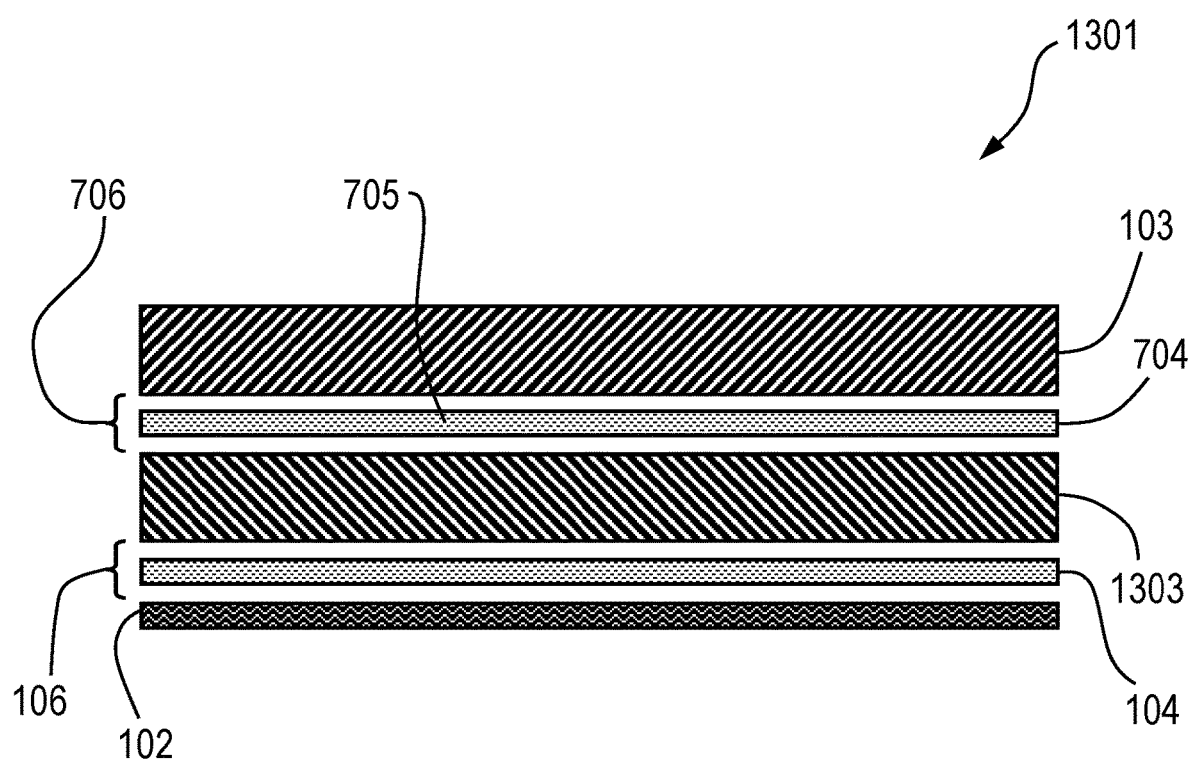

FIG. 13: shows an exploded view of a thirteen embodiment of a multi-layer wound dressing.

Figure 14:
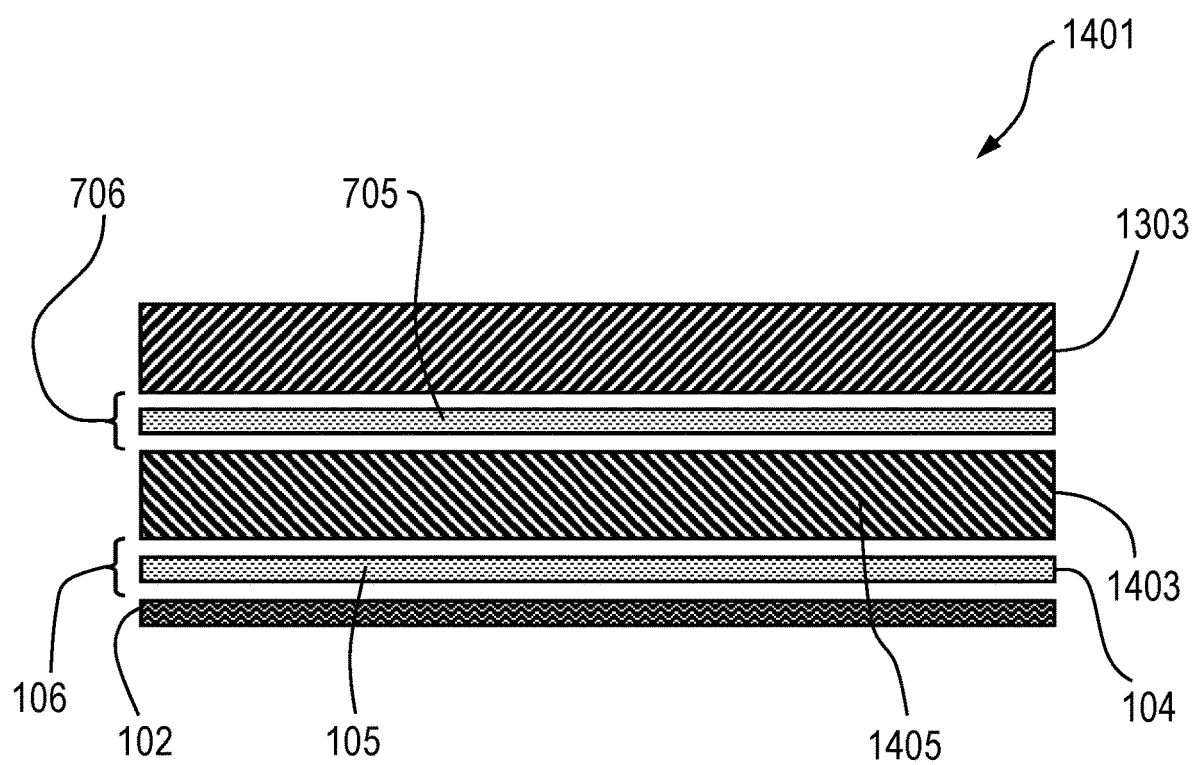

FIG. 14: shows an exploded view of a fourteenth embodiment of a multi-layer wound dressing.

Figure 15:
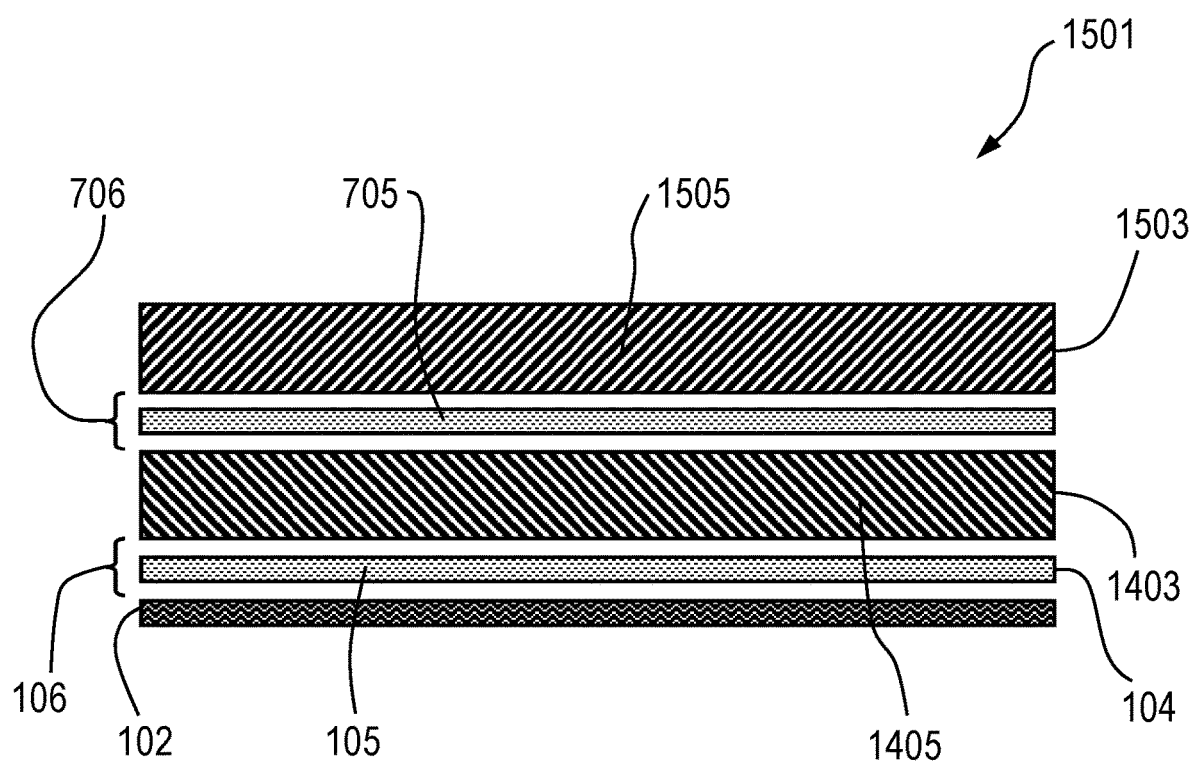

FIG. 15: shows an exploded view of a fifteenth embodiment of a multi-layer wound dressing.

Figure 16:
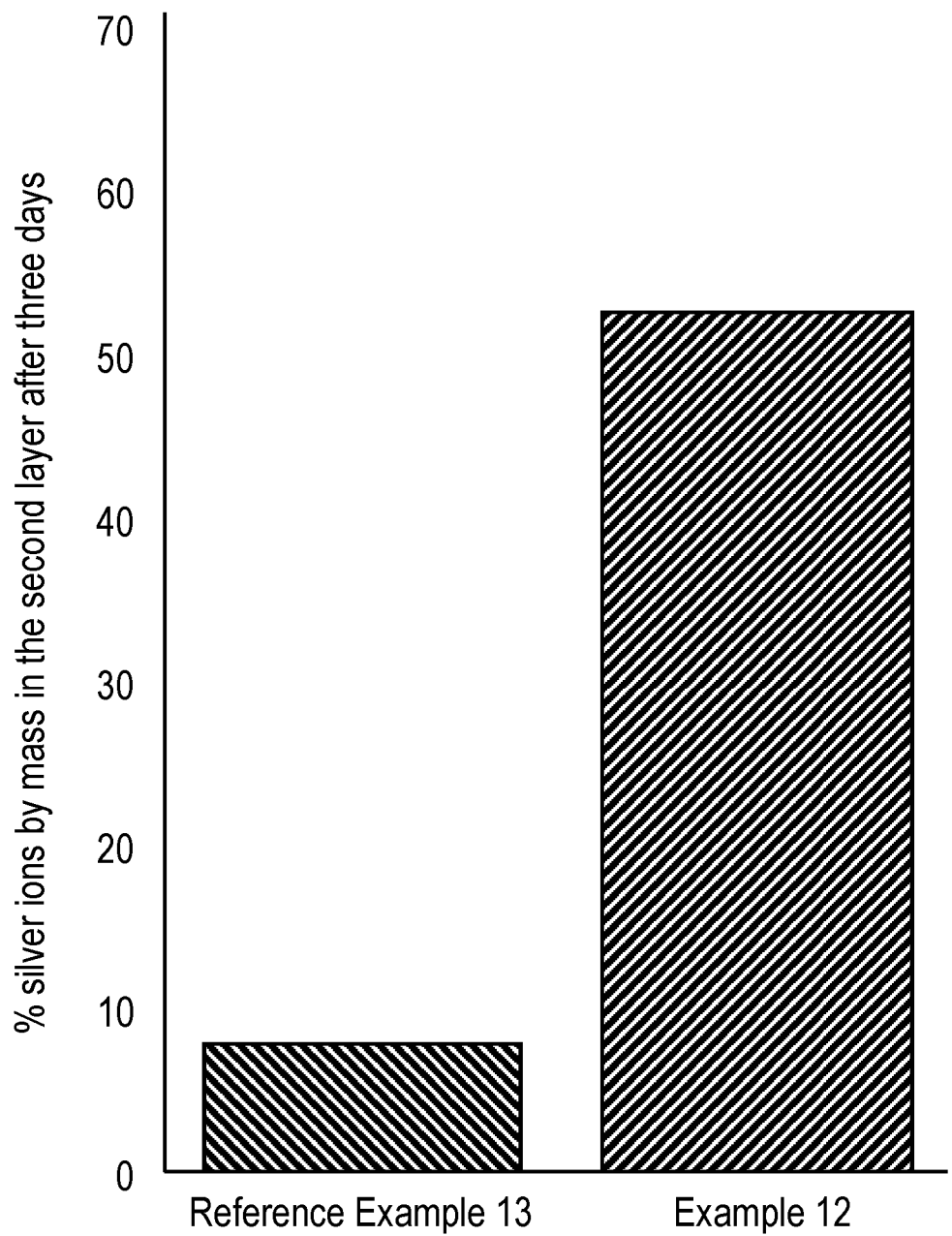

FIG. 16: shows a graph indicating the silver ion migration in Example 12 and Reference Example 13.

Figure 17:
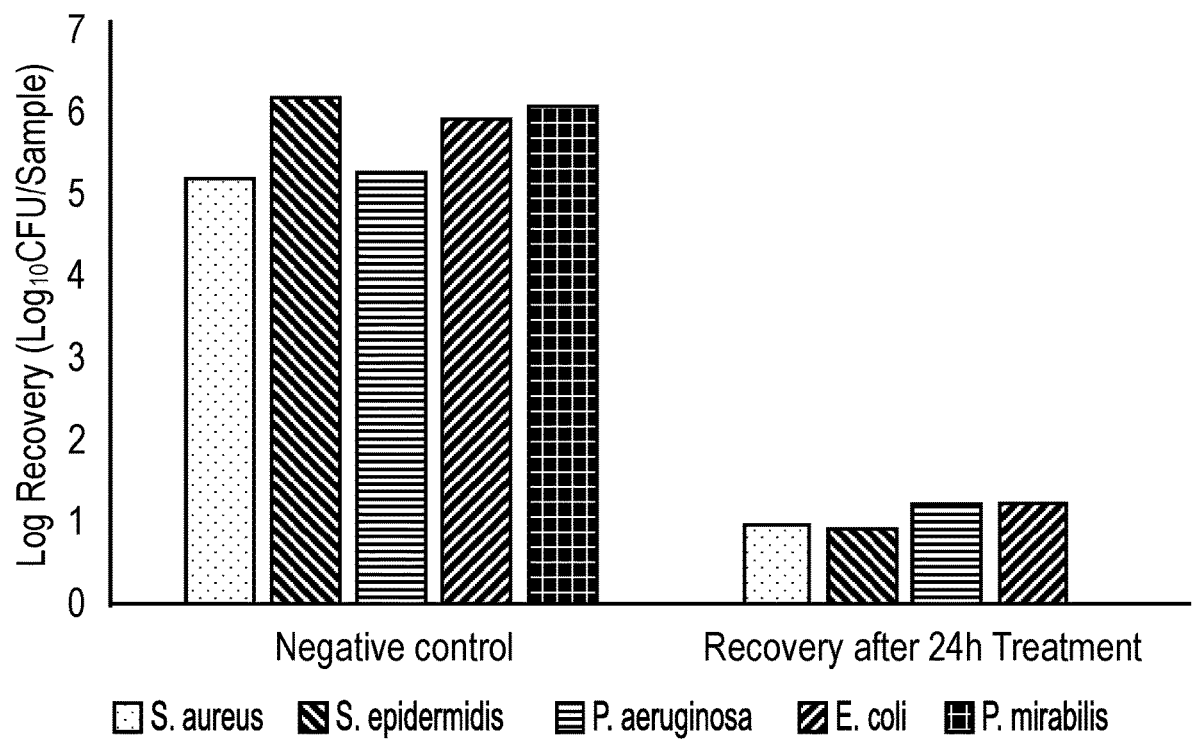

FIG. 17: shows a graph indicating Log Recovery after 24 h treatment time for Example 1 in the AATCC 100 adapted test method.

Figure 18:
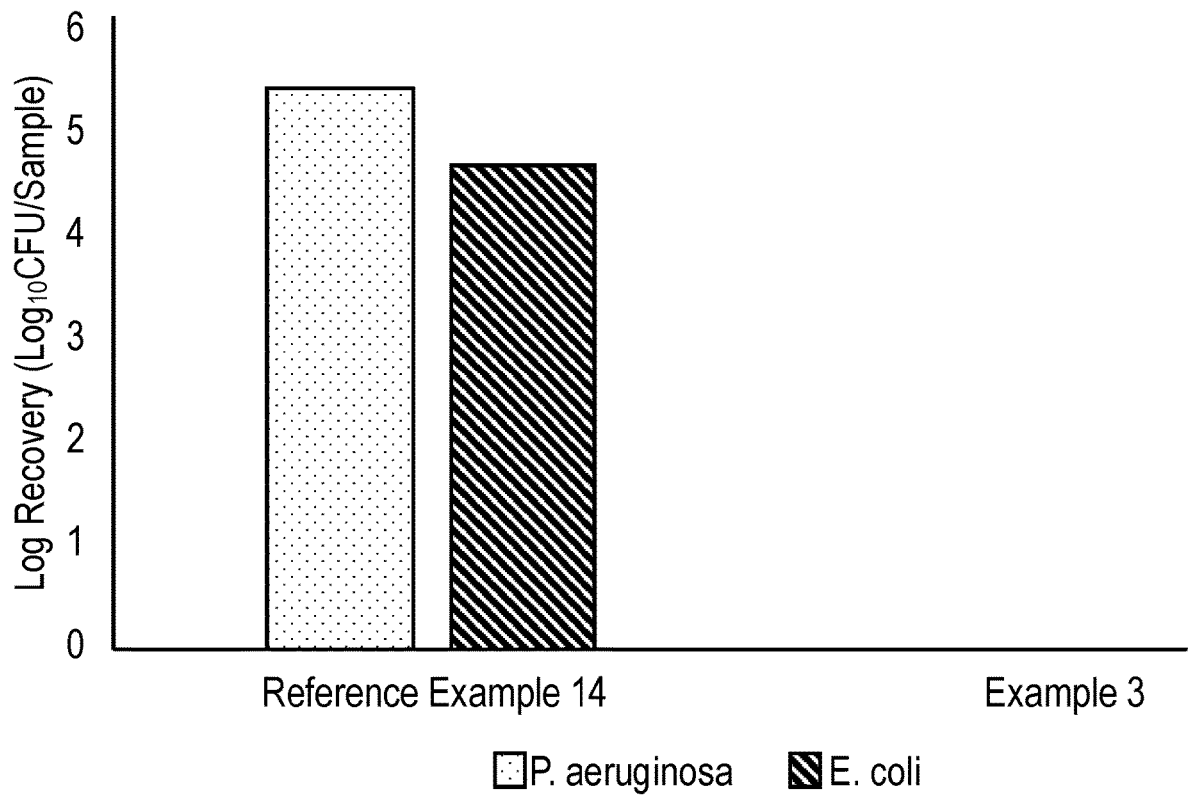

FIG. 18: shows a graph indicating Log Recovery after 24 h treatment time for Example 3 and reference Example 14 in the AATCC 100 adapted test method.

Referring to FIG. 1, there is shown a multi-layer wound dressing (101) comprising a first layer of an absorbent foam being a wound contact layer (102) and a second layer being an absorbent layer (103) comprising a superabsorbent material. The wound contact layer and absorbent layer are bonded together by an adhesive (104). An antimicrobial agent (105) is mixed with an adhesive and located at the first interface (106) between the opposing surfaces of the wound contact layer and the absorbent layer.

The absorbent foam is a polyurethane open celled foam having a thickness between 1.5 mm-3.25 mm. The superabsorbent material is a polyacrylate superabsorbent fibrous nonwoven material.

The adhesive (104) is a powder adhesive that is applied by scattering over either the wound contact layer (102) or absorbent layer (103) and laminated using heat.

The antimicrobial agent (105) is a silver salt.

Referring to FIG. 2, there is shown a multi-layer wound dressing (201) comprising a wound contact layer (102) bonded to an absorbent layer (103) comprising a superabsorbent material. The wound contact layer and absorbent layer are bonded together by an adhesive (104). An antimicrobial agent (105) is mixed with the adhesive (104) and located at the first interface (106) between the opposing surfaces of the wound contact layer (102) and the absorbent layer (203).

In addition to the first interface (106), the absorbent layer (103) also comprises an antimicrobial agent (205).

The antimicrobial agent (105, 205) located at the first interface (106) and in the absorbent layer (203) is a silver salt.

The wound contact layer (102), absorbent layer (203) and adhesive (104) are the same materials as described in FIG. 1.

Referring to FIG. 3, there is shown a multi-layer wound dressing 301 comprising a wound contact layer (302) bonded to an absorbent layer (103). The wound contact layer (302) and absorbent layer (103) are bonded together by an adhesive (104). An antimicrobial agent (105) is mixed with the adhesive (104) and located at the first interface (106) between the opposing surfaces of the wound contact layer (302) and the absorbent layer (103).

In addition, to the first interface (106), the wound contact layer (302) also comprises an antimicrobial agent (305).

The wound contact layer (302), absorbent layer (103), adhesive (104) and antimicrobial agents (105, 305) are the same materials as described in FIG. 1.

Referring to FIG. 4, there is shown a multi-layer wound dressing (401) comprising a first layer of absorbent foam being a wound contact layer (102) bonded to a second layer being an absorbent layer (103) comprising a superabsorbent material and a third layer being a backing layer (407). An antimicrobial agent (105) is mixed with an adhesive (104) and located at the first interface (106) between the opposing surfaces of the wound contact layer (102) and the absorbent layer (103).

The materials of the wound contact layer (102), adhesive (104), absorbent layer (103) and antimicrobial (105) agent is the same as FIG. 1.

The backing layer (407) is a polyurethane film. The backing layer (407) is permeable to air and moisture vapour but impermeable to microorganisms and water droplets.

Referring to FIG. 5, there is shown a multi-layer wound dressing (501) comprising a wound contact layer (102), an absorbent layer (203) and a backing layer (407). An antimicrobial agent (105) is mixed with an adhesive (104) and located at the first interface (106) between the opposing surfaces of the wound contact layer (102) and the absorbent layer (203).

In addition to the first interface (106), the superabsorbent layer (203) comprises an antimicrobial agent (205).

The materials of the wound contact layer (102), adhesive (104), absorbent layer (203) and antimicrobial agents (105, 205) are the same as FIG. 2. The material of the backing layer (407) is the same as FIG. 4.

Referring to FIG. 6, there is shown a multi-layer wound dressing (601) comprising a wound contact layer (302), an absorbent layer (103) and a backing film (407). An antimicrobial agent is mixed with an adhesive (104) and located at the first interface (106) between the opposing surface of the wound contact layer (302) and the absorbent layer (103).

In addition to the first interface, the absorbent foam wound contact layer (302) comprises an antimicrobial agent (305).

The materials of the wound contact layer (302), adhesive (104), absorbent layer (103) and antimicrobial agents (105, 305) are the same as FIG. 3. The material of the backing layer (407) is the same as FIG. 4.

Referring to FIG. 7, there is shown a multi-layer wound dressing comprising a wound contact layer (102), an absorbent layer (103), an antimicrobial agent (105) mixed with an adhesive (104) located at a first interface (106) between the opposing surfaces of the wound contact layer (102) and the absorbent layer (103), a backing layer (407), and an antimicrobial agent (705) mixed with an adhesive (704) located at a second interface (706) between the opposing surfaces of the absorbent layer (103) and the backing layer (407).

The materials of the wound contact layer (102), adhesive (104,704), absorbent layer (103), backing layer (407) and antimicrobial agents (105, 705) are the same as FIG. 4.

Referring to FIG. 8, there is shown a multi-layer wound dressing (801) comprising a wound contact layer (102), an absorbent layer (203), an antimicrobial agent (105) mixed with an adhesive (104) located at a first interface (106) between the opposing surfaces of the wound contact layer (102) and the absorbent layer (203), a backing layer (407), and an antimicrobial agent (705) mixed with an adhesive (704) located at a second interface (706) between the opposing surfaces of the absorbent layer (203) and the backing layer (407).

In addition to the first and second interfaces (106, 706), the absorbent layer (203) also comprises an antimicrobial agent (205).

The materials of the wound contact layer (102), adhesive (104,704), absorbent layer (203), backing layer (407) and antimicrobial agents (105, 205, 705) are the same as FIG. 4.

Referring to FIG. 9, there is shown a multi-layer wound dressing (901) comprising a wound contact layer (302), an absorbent layer (103), an antimicrobial agent (105) mixed with an adhesive (104) located at a first interface (106) between the opposing surfaces of the wound contact layer (302) and the absorbent layer (103), a backing layer (407), and an antimicrobial agent (705) mixed with an adhesive (704) located at a second interface (706) between the opposing surfaces of the absorbent layer (103) and the backing layer (407).

In addition to the first and second interfaces (106, 107), the wound contact layer (302) comprises an antimicrobial agent (305).

The materials of the wound contact layer (13), adhesive (12,18), absorbent layer (11), backing layer (17) and antimicrobial agents (14, 16, 19) are the same as FIG. 4.

Referring to FIG. 10, there is shown a multi-layer wound dressing (1001) comprising a first layer being a wound contact layer (102), a second layer being an absorbent layer (1003), an antimicrobial agent (105) mixed with an adhesive (104) located at a first interface (106) between the opposing surfaces of the wound contact layer (102) and the absorbent layer (1003), and a third layer being a backing layer (407).

The absorbent layer (1003) is an alginate fibre.

The materials of the wound contact layer (102), adhesive (104), backing layer (407) and antimicrobial agent (105) are the same as FIG. 4.

Referring to FIG. 11, there is shown a multi-layer wound dressing (1101) comprising a first layer being a wound contact layer (102), a second layer being an absorbent layer (1103), an antimicrobial agent (105) mixed with an adhesive (104) located at a first interface (106) between the opposing surfaces of the wound contact layer (102) and the absorbent layer (1103), a third layer being a backing layer (407).

In addition to the first interface (106), the absorbent layer (1103) comprises an antimicrobial agent (1105).

The materials of the wound contact layer (102), adhesive (104), absorbent layer (1103), backing layer (407) and antimicrobial agents (105, 1105) are the same as FIG. 10.

Referring to FIG. 12, there is shown a multi-layer wound dressing (1201) comprising a wound contact layer (302) an absorbent layer (1103), an antimicrobial agent (105) mixed with an adhesive (104) located at a first interface (106) between the opposing surfaces of the wound contact layer (102) and the absorbent layer (1103), a backing layer (407).

In addition to the first interface, the wound contact layer (302) comprises an antimicrobial agent (305).

The materials of the wound contact layer (302), adhesive (104), absorbent layer (1103), backing layer (407) and antimicrobial agents (105, 305) are the same as FIG. 10.

Referring to FIG. 13, there is shown a multi-layer wound dressing (1301) comprising a first layer being a wound contact layer (102), a second layer being an absorbent layer (1303) comprising an absorbent foam, an antimicrobial agent (105) mixed with an adhesive (104) located at a first interface (106) between the opposing surfaces of the wound contact layer (102) and the absorbent layer (103), and a third layer being an absorbent layer (103) comprising a superabsorbent material, and an antimicrobial agent (705) mixed with an adhesive (704) located at a second interface (706) between the opposing surfaces of the second layer (1303) and the third layer (103).

The material of the wound contact layer (102), the adhesive (104, 704) and the antimicrobial agent (105, 705) is the same as FIG. 7. The second layer (1303) is an absorbent foam and the third layer (1303) is a superabsorbent material.

Referring to FIG. 14, there is shown a multi-layer wound dressing (1401) comprising a first layer being a wound contact layer (102), a second layer being an absorbent layer (1403), an antimicrobial agent (105) mixed with an adhesive (104) located at a first interface (106) between the opposing surfaces of the wound contact layer (102) and the absorbent layer (1403), and a third layer being an absorbent layer (1303) comprising a superabsorbent material, and an antimicrobial agent (705) mixed with an adhesive (704) located at a second interface (706) between the opposing surfaces of the second layer (1403) and the third layer (1303).

In addition to the first and second interfaces (106, 706), the second layer (1403) comprises an antimicrobial agent (1405).

The material of the wound contact layer (102), the adhesive (104, 704) and the antimicrobial agent (105, 705) is the same as FIG. 7. The material of the second layer (1403) is an absorbent foam. The material of the third layer (1303) is the same as FIG. 13.

Referring to FIG. 15, there is shown a multi-layer wound dressing (1501) comprising a first layer being a wound contact layer (102), a second layer being an absorbent layer (1403) comprising an absorbent foam, an antimicrobial agent (105) mixed with an adhesive (104) located at a first interface (106) between the opposing surfaces of the wound contact layer (102) and the absorbent layer (1403), and a third layer being an absorbent layer (1503) comprising a superabsorbent material, and an antimicrobial agent (705) mixed with an adhesive (704) located at a second interface (706) between the opposing surfaces of the second layer (1403) and the third layer (1503).

In addition to the first and second interfaces, the second layer (1403) and the third layer (1503) comprises an antimicrobial agent (1405, 1505).

Referring to FIG. 1, in use, when the wound contact layer (102) is placed on a wound, since the antimicrobial agent (105) is located at the interface (106), it is freely able to migrate throughout the dressing. As a result, the antimicrobial agent (105) is able to migrate freely into the wound contact layer (102) and the superabsorbent layer (103), thereby increasing the antimicrobial agent concentration throughout the dressing.

Moreover, when the wound contact layer (102) is placed on a wound, wound exudate will pass through the wound contact layer (102) and into the absorbent layer (103). As the wound exudate passes through the dressing and by the antimicrobial agent (105) at the interface (106) between the wound contact layer (102) and the absorbent layer (103), the antimicrobial agent is solubilised in the wound exudate, thereby allowing the antimicrobial agent (105) to be carried with the wound exudate into the absorbent layer (103). This beneficially prevents the growth of microorganisms in an area of the dressing away from the initial application location of the antimicrobial agent (105).

Further embodiments of the present invention will now be further described with reference to the following non-limiting examples.

EXAMPLE WOUND DRESSINGS

Example 1

A first layer being an open celled polyurethane foam with a thickness of 3.25 mm containing 0.52% silver chloride salt by weight of the layer and a second layer comprising a superabsorbent fibre were manufactured. Silver lactate salt antimicrobial agent and a heat sensitive adhesive powder were then mixed in an amount to ensure that the overall silver ion content of the mixture was 2% by weight. This mixture was then applied to a surface of the first layer and the first layer was adjacently bonded to the second layer by the application of heat.

Example 2

A first layer being an open celled polyurethane foam with a thickness of 1.5 mm containing 0.78% silver chloride salt by weight of the layer and a second layer comprising a superabsorbent fibre were manufactured. Silver lactate salt antimicrobial agent and a heat sensitive adhesive powder were then mixed in an amount to ensure that the overall silver ion content of the mixture was 4% by weight. This mixture was then applied to a surface of the first layer and the first layer was adjacently bonded to the second layer by the application of heat.

Example 3

A first layer being an open celled polyurethane foam with a thickness of 3.25 mm containing 0.52% silver chloride salt and 2% citric acid by weight of the layer and a second layer comprising a superabsorbent fibre were manufactured. Silver lactate salt and a heat sensitive adhesive powder were then mixed in an amount to ensure that the overall silver ion content of the mixture was 2% by weight. This mixture was then applied to a surface of the first layer and the first layer was adjacently bonded to the second layer by the application of heat.

Example 4

A first layer being an open celled polyurethane foam with a thickness of 3.25 mm containing 0.52% silver chloride salt by weight of the layer and a second layer comprising a superabsorbent fibre were manufactured. Potassium iodide, potassium iodate and a heat sensitive adhesive powder were then mixed in an amount to ensure that the overall molecular iodine content of the mixture was 2% by weight. This mixture was then applied to a surface of the first layer and the first layer was adjacently bonded to the second layer by the application of heat.

Example 5

A first layer being an open celled polyurethane foam with a thickness of 3.25 mm containing 0.52% silver chloride salt by weight of the layer and a second layer comprising a superabsorbent fibre. Chitosan citrate and chitosan lactate granules were then mixed with an adhesive. This mixture was then applied to a surface of the first layer and the first layer was adjacently bonded to the second layer by the application of heat.

Example 6

A first layer being a perforated silicone wound contact layer and a second layer comprising open celled polyurethane foam with a thickness of 3.25 mm containing 0.52% silver chloride salt by weight of the layer, and a third layer comprising a superabsorbent fibre were manufactured. Silver lactate salt and a heat sensitive adhesive powder were then mixed in an amount to ensure that the overall silver ion content of the mixture was 4% by weight. This mixture was then applied to both a surface of the first layer and a surface of the second layer. The first layer was then adjacently bonded to the second layer and the second layer was adjacently bonded to the third layer by the application of heat.

Example 7

A first layer being an open celled polyurethane foam with a thickness of 3.25 mm and a second layer comprising a superabsorbent fibre was manufactured. Silver lactate salt and a heat sensitive adhesive powder were then mixed in an amount to ensure that the overall silver ion content of the mixture was 2% by weight of the layer. This mixture was then applied to a surface of the first layer and the first layer was adjacently bonded to the second layer by the application of heat.

Example 8

A first layer being an open celled polyurethane foam with a thickness of 3.25 mm containing 0.13% silver lactate salt by weight of the layer, a second layer comprising a superabsorbent fibre and a third layer comprising a PU backing film were manufactured. Silver lactate salt and a heat sensitive adhesive powder were then mixed in an amount to ensure that the overall silver ion content of the mixture was 2% by weight of the layer. This mixture was then applied to both a surface of the first layer and a surface of the second layer. The first layer was adjacently bonded to the second layer and the second layer was adjacently bonded to the third layer by the application of heat.

Example 9

A first layer being an open celled polyurethane foam with a thickness of 3.25 mm, a second layer comprising a 50:50 blend of silver alginate fibre and superabsorbent fibres and a third layer comprising a PU backing film were manufactured. Silver lactate salt and a heat sensitive adhesive powder were then mixed in an amount to ensure that the overall silver ion content of the mixture was 2% by weight of the layer. This mixture was then applied to both a surface of the first layer and a surface of the second layer. The first layer was adjacently bonded to the second layer and the second layer was adjacently bonded to the third layer by the application of heat.

Example 10

A first layer being an open celled polyurethane foam with a thickness of 3.25 mm and a second layer comprising an open celled polyurethane foam with a thickness of 3.25 mm were manufactured. Silver lactate salt and a heat sensitive adhesive powder were then mixed in an amount to ensure that the overall silver ion content of the mixture was 2% by weight of the layer. This mixture was then applied to a surface of the first layer and the first layer was adjacently bonded to the second layer by the application of heat.

Example 11

A first layer being an open celled polyurethane foam with a thickness of 3.25 mm and a second layer comprising a superabsorbent fibre were manufactured. Silver lactate salt and a heat sensitive adhesive powder were then mixed in an amount to ensure that the overall silver ion content of the mixture was 2% by weight of the layer. This mixture was then applied to a surface of the first layer and the first layer was adjacently bonded to the second layer by the application of heat.

Example 12

A first layer being an open celled polyurethane foam with a thickness of 3.25 mm and a second layer comprising a superabsorbent fibre were manufactured. Silver chloride salt antimicrobial agent and a heat sensitive adhesive powder was then mixed in an amount to ensure that the overall silver ion content of the mixture was 2% by weight. This mixture was then applied to a surface of the first layer and the first layer was adjacently bonded to the second layer by the application of heat.

Reference Example 13

A first layer being an open celled polyurethane foam with a thickness of 3.25 mm containing 0.52% silver chloride salt by weight of the layer and a second layer comprising a superabsorbent fibre were manufactured. A heat sensitive adhesive powder was then applied to a surface of the first layer and the first layer was adjacently bonded to the second layer by the application of heat.

Reference Example 14

A first layer being an open celled polyurethane foam with a thickness of 3.25 mm containing 0.52% silver chloride salt and 2% citric acid by weight of the layer and a second layer comprising a superabsorbent fibre were manufactured. A heat sensitive adhesive powder was then applied to a surface of the first layer and the first layer was adjacently bonded to the second layer by the application of heat.

Test Data

Migration of Silver Chloride Throughout the Dressing:

Reference Example 13 was exposed to a solution of simulated wound fluid (foetal bovine serum and peptone water) or saline, designed to replicate wound exudate, for three days, in an inverted Paddington cup arrangement in a temperature and humidity-controlled oven. After three days, the layers of the dressing were separated and subject to elemental analysis. It was found that 7.62% of the silver ions had passed into the second layer.

Similarly, Example 12 was exposed to a solution of simulated wound fluid (foetal bovine serum and peptone water) or saline, designed to replicate the uptake of wound exudate into the dressing, for three days, in an inverted Paddington cup arrangement in a temperature and humidity-controlled oven. After three days, when the layers of the dressing were separated and subject to elemental analysis. Surprisingly, it was found that 52.2% of the silver ions had passed into the second layer.

The results of these tests are shown in FIG. 16. The test results demonstrate that the way that the antimicrobial agent is incorporated into the dressing can significantly improve the ability of the antimicrobial agent to migrate throughout the dressing. As noted above, this is thought to be due to the greater freedom of movement of the antimicrobial agent.

Consequently, it is clear that the location of an antimicrobial agent at the interface between opposing surfaces of two adjacent layers allows the antimicrobial agent to better migrate throughout the dressing, thereby increasing the antimicrobial efficacy of the dressing.

AATCC 100 Adapted Test Method:

To demonstrate the efficacy of the present invention, example dressings were challenged with the adapted AATCC Test Method 100 against a range of microorganisms.

Test Procedure:
a) The examples were aseptically prepared and cut to a size of 4.2×4.2 cm.
b) Simulated wound fluid (SWF) is then prepared aseptically as 50% Foetal Calf Serum (heat activated) and 50% peptone diluent.
c) The examples are then partially to fully saturated with SWF and placed in a humidified environment at 37° C. for 3 days (preconditioning phase).
d) After preconditioning, the examples are removed from the SWF and placed in a clean sterile petri dish.
e) Bacterial suspensions are prepared at approximately 1×106 CFUml-1 in an appropriate growth media.
f) The inoculums are enumerated by performing 10-fold dilutions plating out the resulting suspensions onto an appropriate media.
g) One millilitre of bacterial suspension is used to inoculate the examples that have been pre-conditioned for 3 days and the examples are left to incubate for 24 hours.
h) Following the 24 hr incubation period, the examples are placed into an appropriate neutralizer and viable organisms are recovered by sonication.
i) Microorganisms are enumerated by performing 10-fold dilutions of the neutralizer in growth media and plating the resulting suspensions on to appropriate media.
j) The bacterial recovery after 24 h treatment time for each example was compared to a negative control at 0 hours and the resulting log-reduction calculated.

Example wound dressings 1 and 3 described above were tested on a range of gram-positive and gram-negative bacteria. The Log Recovery for Example 1 is presented in FIG. 17. The log-reductions for Example 1 and Example 3 for each organism are described in Table 1.

Example wound dressing 4 was tested against a gram-positive bacterium, a gram-negative bacterium and a mould. The results are described in Table 2.

TABLE 1

Log-reduction after 24 h treatment time in the AATCC 100 adapted test method.

| | Log-Reduction after 24 h | | | | |
|---|---|---|---|---|---|
| | S. aureus | S. epidermidis | P. aeruginosa | E. coli | P. mirabilis |
| Example 1 | 4.20 | 5.26 | 4.04 | 4.70 | 6.05 |
| Example 3 | 3.38 | 4.93 | 5.25 | 5.90 | Not tested |

TABLE 2

Log-reduction after 24 h treatment time
in the AATCC 100 adapted test method.

| | Log-Reduction after 24 h | | | |
|---|---|---|---|---|
| | S. epidermidis | B. subtilis | P. mirabilis | A. brasiliensis |
| Example 4 | 6.16 | 4.50 | 6.05 | 5.86 |

It is clear from Tables 1 and 2 that the dressing of the present invention results in significant log-reduction of a range of microorganisms after 24 h treatment time in the AATTCC 100 adapted test method.

Moreover, to demonstrate the impact of including an additional antimicrobial between composite layers, Example 3 was compared to Reference Example 14, which is of the same construction but without the additional silver lactate antimicrobial agent mixed with the adhesive between the first and second layers. The dressings were compared in the AATCC-100 adapted test method against *P. aeruginosa* and *E. coli*. The results are presented in FIG. 18.

It is clear from FIG. 18 that the inclusion of an antimicrobial agent at an interface between opposing surfaces of a first and a second layer results in a much greater log reduction than when an antimicrobial agent is only included within a layer of a multi-layer wound dressing alone.

It is of course to be understood that the present invention is not intended to be restricted to the foregoing examples which are described by way of example only.

The invention claimed is:

1. A multi-layer wound dressing comprising at least a first layer and a second layer, wherein the first layer is adjacent to the second layer and bonded thereto; and an antimicrobial agent, wherein the antimicrobial agent is in the form of a powder located at an interface between opposing surfaces of the first layer and the second layer, and wherein the antimicrobial agent is not directly attached or bound to the first and second layers, wherein the first and second layers are bonded by a powder adhesive at the interface between opposing surfaces of the first layer and the second layer, and the antimicrobial agent is mixed with the adhesive.

2. A multi-layer wound dressing according to claim 1, wherein the multi-layer wound dressing further comprises a third layer, the third layer being adjacent to the second layer.

3. A multi-layer wound dressing according to claim 2, wherein an antimicrobial agent is further located at a second interface between opposing surfaces of the second layer and the third layer.

4. A multi-layer wound dressing according to claim 2, wherein the multi-layer wound dressing further comprises a fourth layer, the fourth layer being adjacent to the third layer.

5. A multi-layer wound dressing according to claim 4, wherein an antimicrobial agent is located at a third interface between opposing surfaces of the third layer and the fourth layer.

6. A multi-layer wound dressing according to claim 1, wherein the antimicrobial agent is located at more than one interface.

7. A multi-layer wound dressing according to claim 1, wherein the antimicrobial agent is selected from the group consisting of silver, derivatives of silver, lactic acid, citric acid, benzalkonium chloride, iodine, iodine salts, iodate salts, copper, copper salts, zinc, zinc salts, toluidine blue O, xylitol, chlorhexidine gluconate, polyhexamethylene biguanide (PHMB), miconazole nitrate, and combinations thereof.

8. A multilayer wound dressing according to claim 7, wherein the antimicrobial agent is silver and/or a derivative of silver.

9. A multilayer wound dressing according to claim 7, wherein the antimicrobial agent is iodine.

10. A multilayer wound dressing according to claim 9, wherein an iodate salt and iodide salt react to form iodine in situ.

11. A multi-layer wound dressing according to claim 1, wherein the antimicrobial agent is present in an amount of from 0.001 to 10 wt % of the wound dressing.

12. A multi-layer wound dressing according to claim 1, wherein the antimicrobial agent is further located in a layer of the multi-layer wound dressing.

13. A multi-layer wound dressing according to claim 1, wherein the first layer is a wound contact layer and the second layer is an absorbent layer.

14. A multi-layer wound dressing as claimed in claim 1 for use as a medicament.

15. A multi-layer wound dressing as claimed in claim 1 for use in killing or inhibiting the growth of microorganisms.

16. A multi-layer wound dressing as claimed in claim 1 for use in absorbing fluid discharged from a physiological target, or for use in stemming a flow of a fluid discharged from a physiological target site.

17. A method of manufacturing a multi-layer wound dressing, the method comprising the steps of applying an antimicrobial agent to a surface of a first layer and/or a second layer, locating the first and second layers adjacent to each other and bonding the first layer to the second layer, such that the antimicrobial agent is in the form of a powder located at an interface between opposing surfaces of the first layer and the second layer, and wherein the antimicrobial agent is not directly attached or bound to the first and second layers, wherein the first and second layers are bonded by a powder adhesive at the interface between opposing surfaces of the first layer and the second layer, and the antimicrobial agent is mixed with the adhesive.

* * * * *